(12) United States Patent
Shetty et al.

(10) Patent No.: US 12,229,250 B2
(45) Date of Patent: Feb. 18, 2025

(54) SYSTEM AND METHOD FOR AUTOMATED SECURITY TOOL INTEGRATION

(71) Applicant: Accenture Global Solutions Limited, Dublin (IE)

(72) Inventors: Ramesh Annappa Shetty, Bengaluru (IN); Charan Kura, Hyderabad (IN); Sneha Velayudhan Sathyan, Thane (IN); Deepak Kaushik, New Delhi (IN); Amitabh Mutluru, Bengaluru (IN)

(73) Assignee: Accenture Global Solutions Limited, Dublin (IE)

( * ) Notice: Subject to any disclaimer, the term of this patent is extended or adjusted under 35 U.S.C. 154(b) by 245 days.

(21) Appl. No.: 18/055,457

(22) Filed: Nov. 15, 2022

(65) Prior Publication Data

US 2024/0160724 A1    May 16, 2024

(51) Int. Cl.
*G06F 21/54*    (2013.01)
*G06F 21/31*    (2013.01)
*G06F 21/55*    (2013.01)

(52) U.S. Cl.
CPC ............. *G06F 21/54* (2013.01); *G06F 21/31* (2013.01); *G06F 21/554* (2013.01)

(58) Field of Classification Search
None
See application file for complete search history.

(56) References Cited

U.S. PATENT DOCUMENTS

| | | | |
|---|---|---|---|
| 2021/0075795 A1* | 3/2021 | Liu | H04L 63/083 |
| 2022/0108010 A1* | 4/2022 | Bishop, III | G06F 8/436 |
| 2022/0207140 A1* | 6/2022 | Mooney, III | G06F 21/563 |
| 2022/0417260 A1* | 12/2022 | Kimayong | G06F 21/564 |
| 2023/0045235 A1* | 2/2023 | Pierscieniak | G06F 8/65 |
| 2023/0214209 A1* | 7/2023 | Philip | G06F 8/71 |
| | | | 717/168 |
| 2024/0095160 A1* | 3/2024 | Ozugur | G06F 11/3692 |

* cited by examiner

*Primary Examiner* — Raqiul A Choudhury

(57) ABSTRACT

A DevSecOps integration system that can analyze a source repository and provide recommendations on security services, along with supported security tools, that can be included as part of the DevOps pipeline. The DevSecOps integration system can automatically fit the selected security tools into the appropriate stage of the pipeline to optimize security protection. In some embodiments, the DevSecOps integration system automatically generates various and multiple CI/CD-specific integrations, scripts, and security code. In one example, the security tools are selected in response to user selection(s), such as an initial input file and code parameters, and automatically identifies where the scripts should be inserted in the development process.

20 Claims, 18 Drawing Sheets

SYSTEM AND METHOD FOR AUTOMATED SECURITY TOOL INTEGRATION

TECHNICAL FIELD

The present disclosure generally relates to automated security configuration techniques during software development, and in particular to the configuring of source code for enabling an automatic integration of security tools into the DevOps pipeline.

BACKGROUND

Infrastructure is a core tenet of a software development process—it is directly responsible for the stable operation of a software application. This infrastructure can range from servers, load balancers, firewalls, and databases to complex container clusters. Software development and information technology operations (DevOps) may be utilized to shorten a software development life cycle while delivering features, fixes, updates, etc. in close alignment with business objectives. However, traditional approaches for manually-provisioning and configuring infrastructure to meet the demands of DevOps-based modern rapid software development cycles have become an unscalable solution, in particular with respect to development, security, and operations (DevSecOps).

While it is possible to "retrofit" security protection into applications post completion, this is the most expensive and least effective approach. Viruses, worms, and other attacks due to security flaws in applications cost businesses billions of dollars in lost productivity, system recovery, and information loss every year. Unfortunately, security often remains an afterthought during project development. Recognizing security requirements early, especially in the development phase, is important so that security problems can be tackled early enough before going further in the process and avoid rework. A more effective approach for security requirement engineering is needed to provide a more systematic way for eliciting adequate security requirements and integrating security provisions into each phase of software development.

There is a need in the art for a system and method that addresses the shortcomings discussed above.

SUMMARY

The proposed systems and methods describe an automated, dynamic process for integrating security tools into a DevOps pipeline. The system and method solve the problems discussed above by automatically identifying source code parameters and selecting the most appropriate security tool for integration into the DevOps pipeline. This approach allows the software to be protected throughout its development without requiring niche subject matter experts to assess each of the potential vulnerabilities and threats to the code. These features (among others described) are specific improvements in the way that the underlying computer system operates. In this way, productivity may be improved for a software development platform that includes security tools for each build stage in the development lifecycle. This, in turn, conserves computing resources (e.g., processing resources, memory resources, and/or the like) and networking resources that would otherwise be wasted inefficiently utilizing such tools, selecting software developers to handle new software requirements and/or defects, and identifying corrections for defects. Furthermore, security of the software is improved and application and infrastructure is secured from vulnerabilities.

In one aspect, the disclosure provides a computer-implemented method of automatically integrating security tools into a DevOps pipeline. The method includes a first step of receiving, by a security integration system and from a client device, access to a source code stored in a repository. A second step includes processing, by the security integration system, the source code with an analyzer engine, to identify a first file type used in the source code, and a third step includes automatically selecting, by the security integration system and in response to identification of the first file type, a first security tool suited to detect security threats in the first file type, the first security tool associated with a first script template. In addition, the method includes a fourth step of automatically generating, by the security integration system, a first integration script based on the first script template, and a fifth step of inserting, from the security integration system, the first integration script into the source code. Furthermore, the method includes a sixth step of automatically initiating integration of the first security tool into the DevOps pipeline for the source code.

In another aspect, the disclosure provides a non-transitory computer-readable medium storing software comprising instructions executable by one or more computers which, upon such execution, cause the one or more computers to: (1) receive, by a security integration system and from a client device, access to a source code stored in a repository; (2) process, by the security integration system, the source code with an analyzer engine, to identify a first file type used in the source code; (3) automatically select, by the security integration system and in response to identification of the first file type, a first security tool suited to detect security threats in the first file type, the first security tool associated with a first script template; (4) automatically generate, by the security integration system, a first integration script based on the first script template; (5) insert, from the security integration system, the first integration script into the source code; and (6) automatically initiate integration of the first security tool into a DevOps pipeline for the source code, thereby merging the first integration script and the source code.

In yet another aspect, the disclosure provides a system for automatically integrating security tools into a DevOps pipeline, the system comprising one or more computers and one or more storage devices storing instructions that may be operable, when executed by the one or more computers, to cause the one or more computers to: (1) receive, by a security integration system and from a client device, access to a source code stored in a repository; (2) process, by the security integration system, the source code with an analyzer engine, to identify a first file type used in the source code; (3) automatically select, by the security integration system and in response to identification of the first file type, a first security tool suited to detect security threats in the first file type, the first security tool associated with a first script template; (4) automatically generate, by the security integration system, a first integration script based on the first script template; (5) insert, from the security integration system, the first integration script into the source code; and (6) automatically initiate integration of the first security tool into a DevOps pipeline for the source code, thereby merging the first integration script and the source code.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
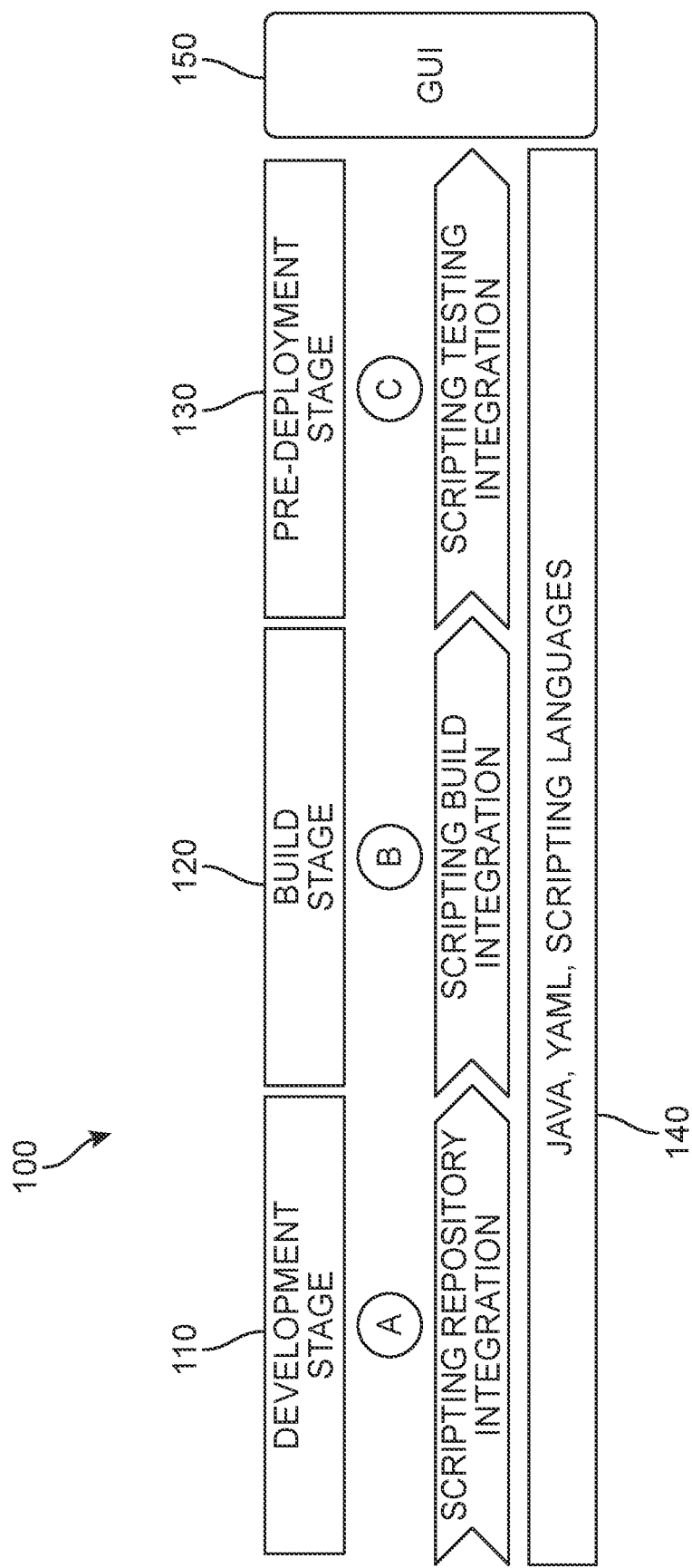
FIG. 1 is an overview of a series of stages of a pipeline in which a DevSecOps integration can be implemented, according to an embodiment.

Integration of the various security tools that are needed to protect software into its DevOps pipeline remains a complex task, often involving extensive research on available or potential tools, an understanding of the application programming interfaces (APIs) that are exposed and must be protected, what scripts can be included with what type or extent of customizations, the CI/CD (Continuous Integration/Continuous Delivery) specific configurations, bug tracking, and other tools integrations. Throughout this process, there is a need for specialized and niche skilled resources—such as highly experienced and/or trained software development professionals and others with advanced knowledge—to design and deliver these integrations.

As a general matter, software development and information technology operations may be implemented by a software development platform. The software development platform may include tools for software coding (e.g., code development and review, source code management tools, code merging, and/or the like); software building (e.g., continuous integration tools, build status, etc.); software testing (e.g., continuous testing tools that provide quick and timely feedback on business risks); software packaging (e.g., artifact repository, application pre-deployment staging, etc.); software releasing (e.g., change management, release approvals, release automation, etc.); software configuring (e.g., infrastructure configuration and management, infrastructure as code tools, etc.); software monitoring (e.g., applications performance monitoring, end-user experience, etc.); etc.

As noted above, software development and information-technology operations (DevOps) aims to shorten a software development life cycle and provide continuous delivery of high-quality software. In different embodiments, software resource deployment can be performed using software management tools such as Jenkins®, GitHub®, GitLab®, Terraform®, Chef®, Ansible®, Helm®, AWS CloudFormation®, Azure Resource Manager®, Google Cloud Deployment Manager®, and other software development and IT operations (DevOps) and continuous integration/continuous delivery (CI/CD) platforms. Such tools allow for software deployment, which includes both provisioning of cloud resources through code, rather than through manual processes, and configuration.

As a general matter, provisioning refers to a process of setting up IT infrastructure, and/or the steps required to manage access to data and resources, and make them available to users and systems. Provisioning tools are designed and set up to provision the infrastructure desired such as servers (VMs), load balancers, databases, networking configuration, etc. Server provisioning includes setting up the physical hardware in a datacenter, installing and configuring software, including the operating system and applications, and connecting it to middleware, networks, and storage. User provisioning is a type of identity management that monitors access rights and authorization privileges. Provisioning is defined through user objects, such as employees, vendors, contractors, etc. and user attributes. Services provided might include email, access to a database, or access to a network. Network provisioning can include setting up a network to be accessed by users, servers, containers, and IoT devices, among other things. Service provisioning includes the set-up of a service and managing the data related to it. Service provisioning has applications in the telecommunications industry, in setting up a service for a customer, as well as with cloud infrastructure. Automating infrastructure provisioning with IaC allows developers to avoid manual management servers, operating systems, storage, and other infrastructure components each time they develop or deploy an application. With IaC, configuration files are created that contain the necessary infrastructure specifications, and only a script need be executed to perform the provisioning.

Configuration of the system can then occur after provisioning. For purposes of this application, configuration (or configuration management) refers to a systems engineering process for establishing and maintaining computer systems, servers, and software in a desired, consistent performance—state. Managing IT system configurations involves defining a system's desired state—like server configuration—then building and maintaining those systems. Configuration systems are designed or set up to install packages or software, manage software and configurations on existing infrastructure. In many cases, the same tools that are used for provisioning and also or can also be used for configuration management. Thus, a provisioning tool creates resources for the system, and a configuration tool customizes those resources to a set of specifications defined by the developers in order for the resources to be of use to the particular software. These software development tools can be used by organizations to set up complex infrastructure in a cloud environment.

However, implementing software development and information-technology operations (DevOps) platforms has traditionally required a strong knowledge base, skillset, and effort to identify a correct set of infrastructure, applications, tools, etc. for the DevOps platforms. Current techniques to identify, install, configure, etc. required infrastructure, applications, tools, and/or the like for DevOps platforms are time consuming and resource intensive. Thus, current techniques for implementing a DevOps platform waste computing resources (e.g., processing resources, memory resources, communication resources, etc.), networking resources, human resources, and/or the like. The wasted resources are associated with manually processing (e.g., identifying, installing, configuring, etc.) of required infrastructure, applications, tools, and/or the like for a DevOps platform; identifying misconfigurations in the DevOps platform; correcting the misconfigurations in the DevOps platform, and/or like.

Various CI/CD practices seek to bolster software development and the operations described above by ensuring that the entire process of building, testing and deployment of applications is done in an automated manner. Usually, this is achieved by implementing an automation pipeline that leverages CI/CD engines. The pipeline can be triggered when a new "commit" is made to an application's source code repository. As a result, a series of stages are executed, which, in the most standard implementations, go through the building of the application, testing it, and deploying it. Security of the applications is typically incorporated into the pipeline when teams discover security vulnerabilities through testing of the live applications, or after they have been exploited by malicious actors. In an effort to address these threats, several tools in the market are designed to detect these problems early in the software development life-cycle. However, such security tools are more often than not specific to a certain type of security check. Thus, in a situation where different types of automated security checks are desired, the results of different tools will be often spread disparately, making their integration and operations less actionable by security teams and less reliable.

As will be described herein, a DevSecOps integration system that facilitates and enables the automated generation of DevSecOps integrations based on a predefined set of configurations and parameters can greatly facilitate the DevSecOps process and allow for secure software development even when there is a dearth of niche resources. In some embodiments, such an integration tool represents a unified and comprehensive solution for configuring different security tools in response to a user's selection, automatically generating or downloading pipeline scripts for integration with a source code repository. In one example, the DevSecOps integrator tool of the proposed systems can reduce both time and manual efforts traditionally required that involve researching of individual CI tools, security tool, software configuration management (SCM) tools, and/or running the scripts through a vulnerability aggregator to integrate security in DevOps.

In some embodiments, the proposed systems and methods can analyze existing "main code" in the source code repository and identify which technologies are being used (e.g., using information from user selections, file extensions, file metadata, etc.) and, based on which tools are identified, select the security tool appropriate for the code. The DevSecOps integrator tool can also, in one example, use templates to determine where to insert the security code into the main code. In different embodiments, the proposed DevSecOps integrator tool can be generate and download integration scripts automatically based the configurations fed into the platform for different CI/CD platforms such as Jenkins®, GitHub® actions, GitLab®, and Azure®, etc., as well as perform integrations of security tools for SAST (Static Application Security Testing), DAST (Dynamic Application Security Testing), SCA (Software Composition Analysis), Secret Scanning, Container Security Scanning, and IAST (Interactive Application Security Testing). In one embodiment, the DevSecOps integrator tool can also 'push' the pipeline script to SCM repositories. Thus, DevSecOps integrator tool can integrate respective security tools with standard vulnerability aggregators and/or bug tracking tools such as DefectDojo®, Jira®, Threadfix®, and other bug tracking tools. The DevSecOps integrator tool reduces the effort required for integrations DevSecOps by eliminating some or all of the dependency on the niche skilled resources during DevSecOps integration projects. In some embodiments, the DevSecOps integrator tool was shown to generate re-usable integrations, thereby reducing up to 80% of the manual efforts typically invested in such projects. For example, re-usable scripts can be utilized for faster onboarding of security into the DevOps pipeline. The proposed DevSecOps integrator tool can further be scaled to various CI/CD platforms and be implemented for use by a large number of DevSecOps application onboarding paradigms, allowing for continuous security support in the DevOps pipeline with less vulnerability to human errors.

In this way, the DevSecOps integrator tool dynamically generates and deploys a customized security integration for selected applications, tools, and artificial intelligence assets. The DevSecOps integrator tool may generate and configure a customized platform (e.g., a DevOps platform) for a user based on user selected applications, tools, artificial intelligence assets for the selected platform. This, in turn, conserves computing resources, networking resources, and/or the like that would otherwise have been wasted by manually processing (e.g., identifying, installing, configuring, etc.) of required security infrastructure, applications, tools, and/or the like for a DevOps platform; identifying security misconfigurations in the DevOps platform; correcting the security misconfigurations in the DevOps platform, and/or like.

While the disclosed embodiments are based on software project management, it is understood that other project-based systems can benefit from a security component integration tool, as disclosed herein. For example, systems that are being developed to support large-scale operations may benefit from the disclosed techniques, as disclosed herein. In addition, systems for managing and tracking security issues of other types of large, distributed systems with many moving parts or stages of development, can implement embodiments of the security requirement identification system described herein. For example, facilities such as factories, hospitals, manufacturing plants, as well as other facilities with multiple components that rely on each other to perform optimally can be potentially impacted by a wide variety of security issues that can detract from their performance over time. Tracking these issues using the proposed security requirement identification system can (a) ensure security issues are addressed preemptively and efficiently and (b) help the organization appreciate what types of issues are recurring and/or how often they occur, whether the security requirement is a long-term or short-term issue, involves the distribution of resources, inter-personnel communication, or the operation of the devices and hardware supporting the facility, etc. Such knowledge can significantly improve the performance of the facility over the long run, as well as reduce operating costs by fostering proactive interventions during the facility's development. In different embodiments, the system described herein can be configured to provide an early warning to developers to incorporate specific mitigating features in the project. Moreover, automation of security script integration increases the quality of the project during development, thereby reducing errors relating to a project relative to manual completion of the process.

For purposes of introduction, a schematic diagram 100 depicting an embodiment of the proposed process is provided in FIG. 1. The process includes three stages representing a high-level approach for automating a DevSecOps-based integration, for example via a CI/CD pipeline. A DevSecOps intelligent analyzer module of the DevSecOps integration system can be configured to analyze the source repository and provide recommendations on security services and associated security tools to be included as part of the pipeline. The DevSecOps integration system can then fit or perform the tool integration at appropriate stage of pipeline.

For example, in a first stage 110 ("development stage"), the process can involve an automated integration with the scripting repository, as well as integration of one or more of a pre-commit hook (e.g., Git secret, Truffle's® TruffleHog, etc.), an SCA tool (e.g., OWASP® Dependency-Check (DC), Snyk®, White Source®, Black Duck®, etc.), and an IAC Security tool (e.g., Snyk®, Checkov/Bridgecrew®, Terrascan®, etc.). As a general note, scripting can use one or more scripting, data-serialization, programming, and/or configuration languages such as Java, YAML, Groovy, Python, Powershell, etc.

During a second stage 120 ("build stage"), there may be an automated integration with the scripting build, as well as integration of one or more of a SAST tool (e.g., SonarQube® (Find Security Bugs), Fortify®, AppScan®, Veracode®, etc.), an SCA tool (OWASP® DC, Snyk®, White Source®, Black Duck®, Veracode®, etc.), and a Container Security tool (e.g., Snyk®, Anchore®, Qualys®, Aquasec®, Prisma®, etc.). At a third stage 130 ("pre-deployment stage"), there can be automated test integration, including integration of one or more of a DAST tool (e.g., Zap®, Web Inspect®, AppScan®, Veracode®, etc.), an IAST tool (e.g., Synopsis®, MicroFocus®, etc.), and a Container Security tool (e.g., Anchore®, Qualys®, Aquasec®, Prisma®, etc.). Thus, the correct and necessary security tools are automatically implemented in the software pipeline at the right stages and times, providing security services across the application that can, for example, help protect users of the GUI.

Figure 2:
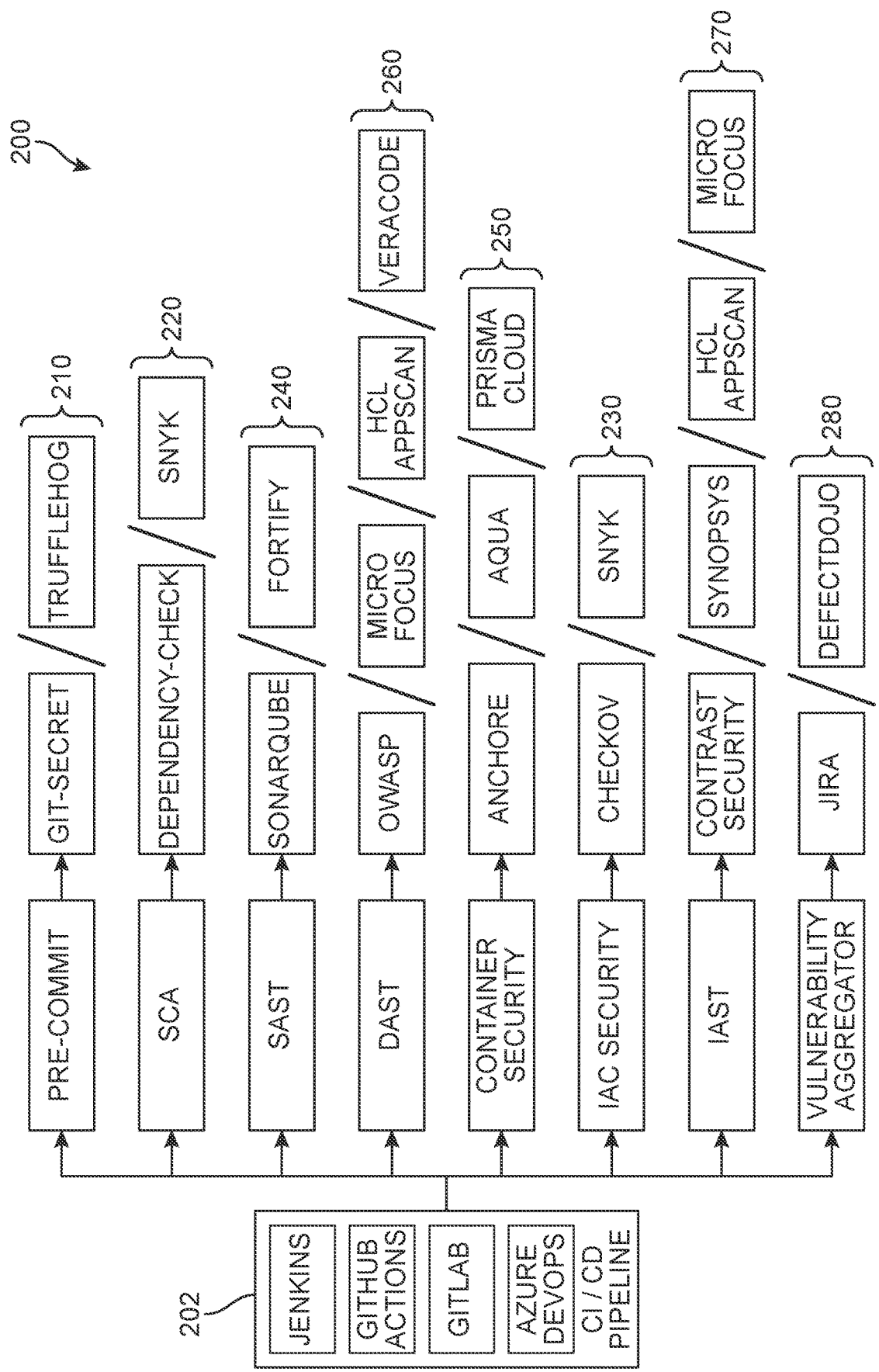
FIG. 2 is a high-level view of a plurality of build stages in a DevOps pipeline and supported security tools that can be automatically integrated using the proposed system, according to an embodiment.

An embodiment of this process is depicted in greater detail in a schematic flow diagram 200 of FIG. 2. As noted earlier, in some embodiments, one or more CI/CD servers 202 can be used by the developers that enable automation for various stages of software development, testing, and deployment. Some non-limiting examples include Jenkins®, GitHub® Actions, GitLab®, and AzureDevOps®. Some other examples that are compatible with the proposed systems can include Atlassian® Bamboo, JFrog® Pipelines, Spinnaker®, JetBrains® TeamCity, BuildMaster®, Travis® CI, Bitrise®, CircleCI®, Google® Cloud, Copado® CI/CD, CloudBees® CI, Red Hat® Ansible Automation Platform, and AWS® CodePipeline.

In different embodiments, the DevSecOps integration system can perform automated security tool integrations to ensure that specific and appropriate security tools are integrated into the correct phase or site of the CI/CD pipeline, via its analyzer module (e.g., see FIGS. 5 and 6A-6C). For example, the pipeline can involve a repository security phase, which can comprise a pre-commit stage 210, an SCA stage 220, and an IAC Security stage 230. In some embodiments, the DevSecOps integration system can be configured to automatically integrate security tools during the pre-commit stage 210, when the code is reviewed before it goes to the main repository of the version control system. Thus, in this stage, security tools related to repository vulnerabilities can be automatically integrated, such as Git-Secret®, which scans the repository recursively for credentials (e.g., git secrets--scan [-r|--recursive] [--cached] [--no-index] [--untracked] [<files> . . . ]), and TruffleHog®, which searches through git repositories for secrets, digging deep into commit history and branches (e.g., trufflehog--regex--entropy=False https://github.com/dxa4481/truffleHog.git).

Similarly, in different embodiments, the DevSecOps integration system can be configured to automatically integrate security tools in the SCA (Software Composition Analysis) stage 220, when all of the open-source components and libraries being incorporated into the software are detected and managed. In this stage, security tools related to open-source components are automatically integrated, such as Dependency-Check® and Synk®, which are configured to scan the repository for opensource software vulnerabilities. In addition, the DevSecOps integration system can be configured to automatically integrate security tools in the IAC Security stage 230, when infrastructure-as-code (IAC) is used to deploy and configure cloud-based infrastructure. IAC is a powerful process that is also associated with significant security challenges, including reliance on complex enterprise networks that span on-premises data centers and multi-cloud environments, which make it difficult to develop an IAC codebase that is manageable, effective, and secure, the nature of IAC cyber threats that are constantly evolving, requiring IAC scripts be designed, reviewed, and updated to ensure that they configure the infrastructure to be secure against the latest cyber threats, and the limited resources that constrain the ability of the corporate IT environments to configure, maintain, and secure the scripts. Thus, in this stage, the DevSecOps integration system can automatically integrate security tools related to the process of secure configuration management for the virtualized IT resources, such as Checkov® and Synk®, which are configured to scans the repository for IAC related security issues and config checks at the infrastructure code level.

In another example, the CI/CD pipeline can include a build security integration phase, which can comprise a SAST (static application security testing) stage 240, the SCA stage 220, and a Container Security stage 250. In some embodiments, the DevSecOps integration system can be configured to automatically integrate security tools during the SAST stage 240, when the source code is examined for security defects. In this stage, the DevSecOps integration system can automatically integrate security tools related to "white box" testing of all files containing source code, such as SonarQube®, which scans for code quality and code security and empowers developers to write cleaner and safer code, and Fortify®, which scans source code for various application security vulnerabilities and provides remediation guidelines. When integrated into a CI/CD pipeline, Fortify® scanning occurs on every commit and, if using a branching strategy, any issues can be resolved prior to merging back into the main branch. These selections can be based on the programming language being used and the file extensions (see FIGS. 6A-6C below). Integrating SAST tools into modern CI/CD pipelines allows for a continuous monitoring of the code, providing insights needed to regulate the security standards, and faster identification and remediation of vulnerabilities.

In addition, in some embodiments, the DevSecOps integration system can be configured to automatically integrate security tools during the SCA stage 220 of the build security integration phase, as described above with respect to the repository security phase. Similarly, in some embodiments, the DevSecOps integration system is configured to automatically integrate security tools during the Container Security stage 250, when protection of a containerized environment occurs by implementing and maintaining security controls that protect containers and the underlying infrastructure, including the container host and images, as well as the entire component stack used throughout the DevOps lifecycle, such as Anchore®, Aqua®, and Prisma Cloud®, which scan containers and images for security vulnerabilities, compliance violations, and configuration issues.

In another example, the CI/CD pipeline can include a security test integration phase, which can comprise a DAST (dynamic application security testing) stage 260, an IAST (interactive application security testing) stage 270, and the Container Security stage 250. In some embodiments, the DevSecOps integration system can be configured to automatically integrate security tools during the DAST stage 260, when a DAST tool can interacts with a running application or other API from the 'outside' and attempt to break into it, such as OWASP®, Micro Focus®, HCL® AppScan, and VeraCode®, which can send requests, read responses, and repeatedly attempt to break into the application by exploiting common software vulnerabilities in order to find many of the possible vulnerabilities that a malicious actor would also experience when trying to hack into the app. The appropriate security tool can uncover vulnerabilities like SQL injection, XSS, etc. Furthermore, in some embodiments, the DevSecOps integration system is configured to automatically integrate security tools during the IAST stage 270, when security tools such as Contrast Security®, Synopsys®, HCL AppScan®, and MicroFocus® can identify and manage security risks associated with vulnerabilities discovered in running web applications using dynamic testing (often referred to as runtime testing) techniques, and detect web application vulnerabilities by implementing an agent that is deployed in the web-server itself. In addition, in some embodiments, the DevSecOps integration system can be configured to automatically integrate security tools during the Container Security stage 220 of the security test integration phase, as described above with respect to the build security integration phase.

It can be appreciated that the execution of each of these stages can involve multiple and various tools, as described above. In many cases, these tools generate output in different formats, and managing such output can be cumbersome. A vulnerability aggregator stage 280 can be executed or occur at any point along the CI/CD pipeline, and the DevSecOps integration system can be configured to automatically integrate security aggregators such as Jira® and DefectDojo® into the CI/CD pipelines for defect management. Vulnerability management and aggregation thus refers to the entire process of identifying, evaluating, treating and reporting security vulnerabilities in a given application or information system. For example, integration of DefectDojo® into the CI/CD pipeline can enable aggregation of all the information about vulnerabilities, as the application natively supports integration with over 20 other security tools' reporting formats, and provides an API that can be used for automating various security features, including the importing of scan results.

Figure 3A:
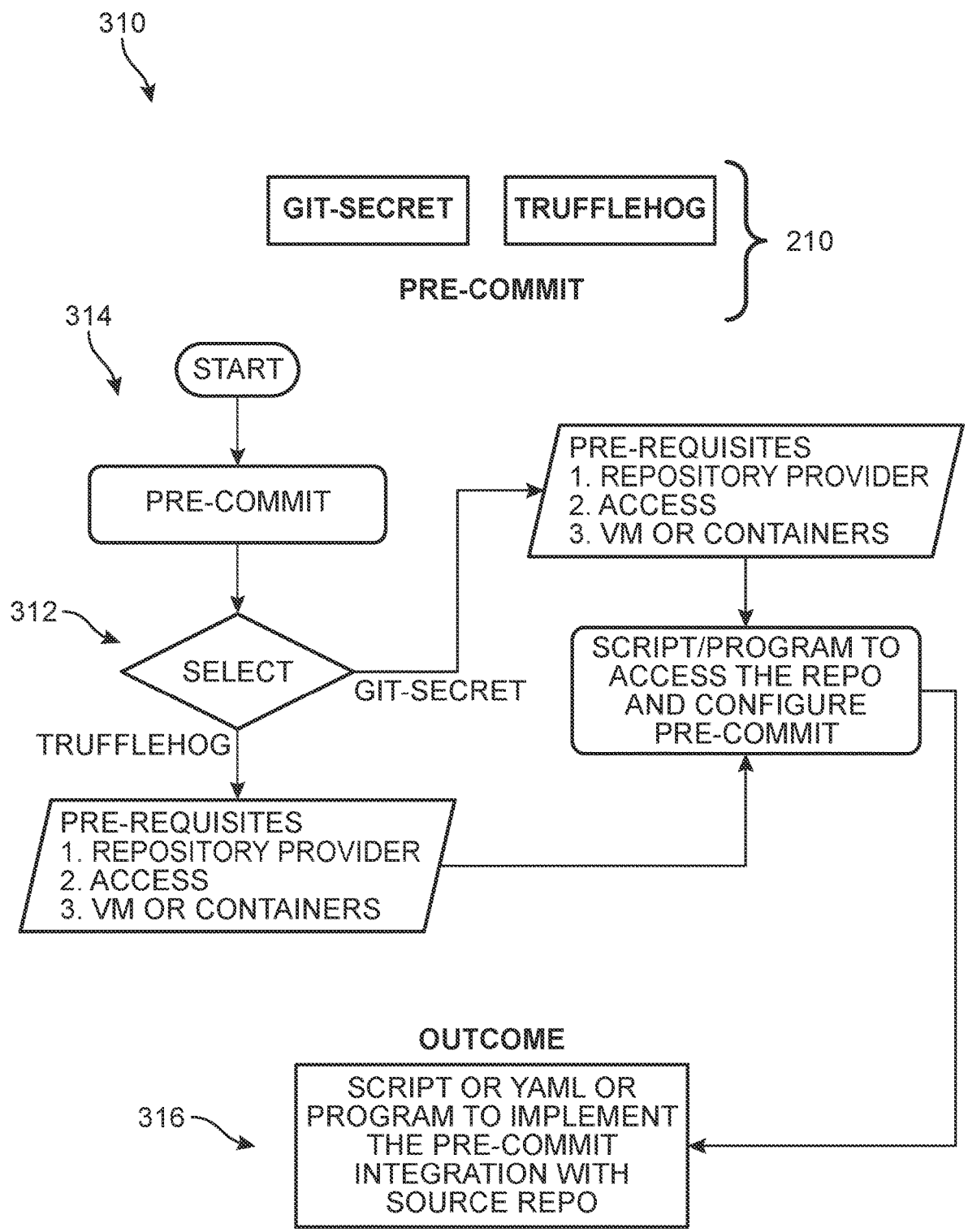
FIGS. 3A-3C are examples of integration processes that may be performed during the source repository security integration phase of a DevOps pipeline, according to some embodiments.
Figure 3B:
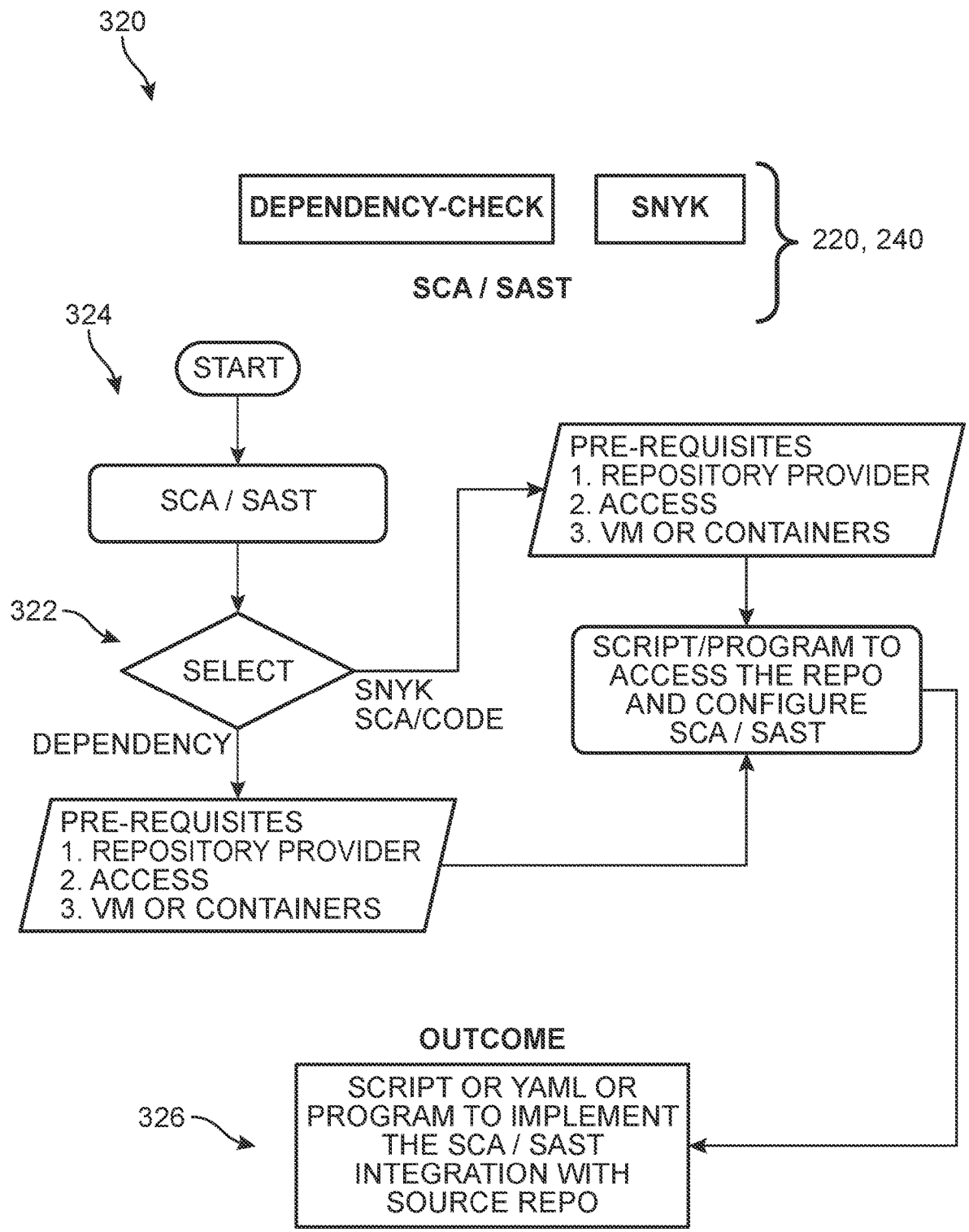
Figure 3C:
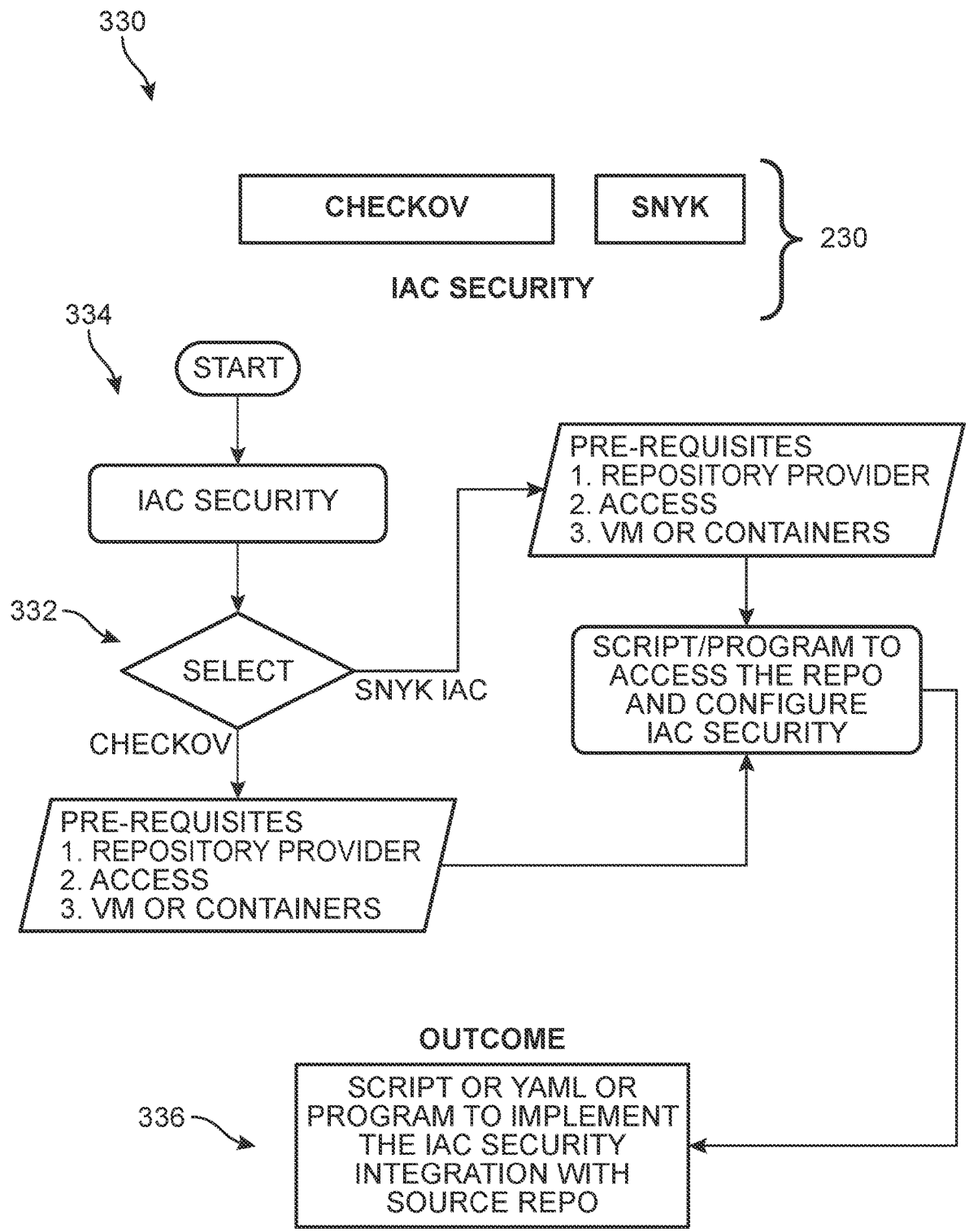

Referring now to FIGS. 3A-3C, additional details regarding the integration process for some of the CI/CD stages during the source repository security integration phase are illustrated in a series of flow diagrams, according to an embodiment. In FIG. 3A, a first process 314 for the pre-commit stage 210 is depicted, where the flow path includes a first branched path 312 at which the security tool integration process is determined by a selection of either of the two leaked secret detection platforms. In both the case where Trufflehog® is chosen or where Git-Secret® is chosen, pre-requisites for the integration can include the identification of a repository provider, enabling access to the repository or source code, and defining the type of a virtual machine (VM) or containers (serverless) that are being used. The script or program can then be given access to the repository ("repo") and the DevSecOps integration system can automatically prepare and implement the pre-commit configuration. A first outcome 316 can include automated generation and integration of a script, YAML, or other program that will implement the selected pre-commit configuration with the source repository.

In FIG. 3B, a second process 324 for the SCA stage 220 and SAST stage 240 is depicted, where the flow path includes a second branched path 322 at which the security tool integration process is determined by a selection of either of the two dependencies with known vulnerabilities detection platforms. In both the case where Dependency-Check® is chosen or where Synk® is chosen, pre-requisites for the integration can include the identification of a repository provider, enabling access to the repository or source code, and defining the type of a virtual machine (VM) or containers (serverless) that are being used. The script or program can then be given access to the repository ("repo") and the DevSecOps integration system can automatically prepare and implement the SCA or SAST configuration. A second outcome 326 can include automated generation and integration of a script, YAML, or other program that can implement the selected SCA/SAST configuration with the source repository.

In FIG. 3C, a third process 334 for the IAC security stage 230 is depicted, where the flow path includes a third branched path 332 at which the security tool integration process can be determined by a selection of either of the two IAC vulnerability and cloud misconfiguration detection platforms. In both the case where Checkov® is chosen or where Synk® IAC is chosen, pre-requisites for the integration can include the identification of a repository provider, enabling access to the repository or source code, and defining the type of a virtual machine (VM) or containers (serverless) that are being used. The script or program can then be given access to the repository ("repo") and the DevSecOps integration system can automatically prepare and implement the IAC Security configuration. A third outcome 336 can include automated generation and integration of a script, YAML, or other program that can implement the selected IAC Security configuration with the source repository.

Figure 4A:
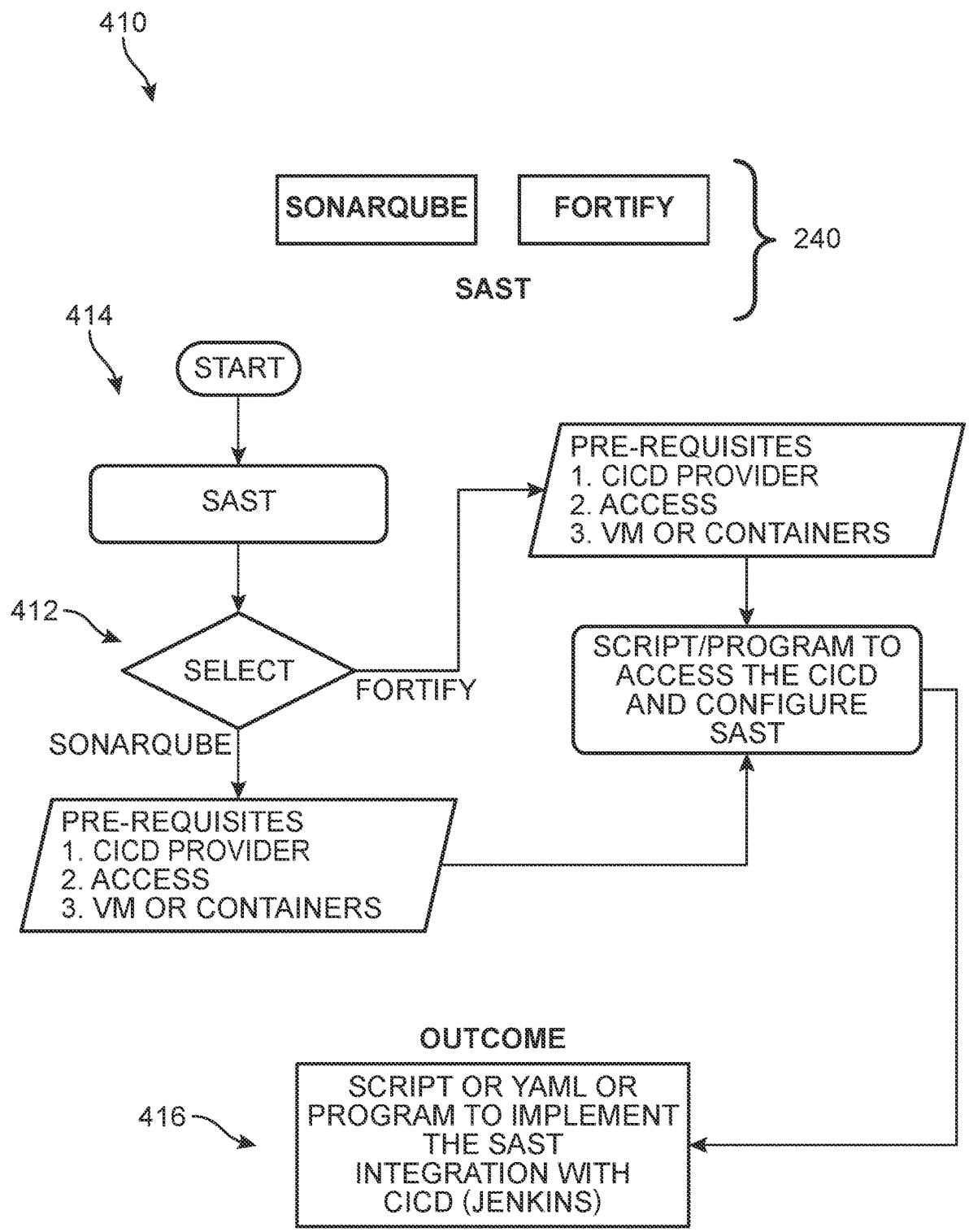
FIGS. 4A-4C are examples of integration processes that may be performed during the build security integration phase of a DevOps pipeline, according to some embodiments.
Figure 4B:
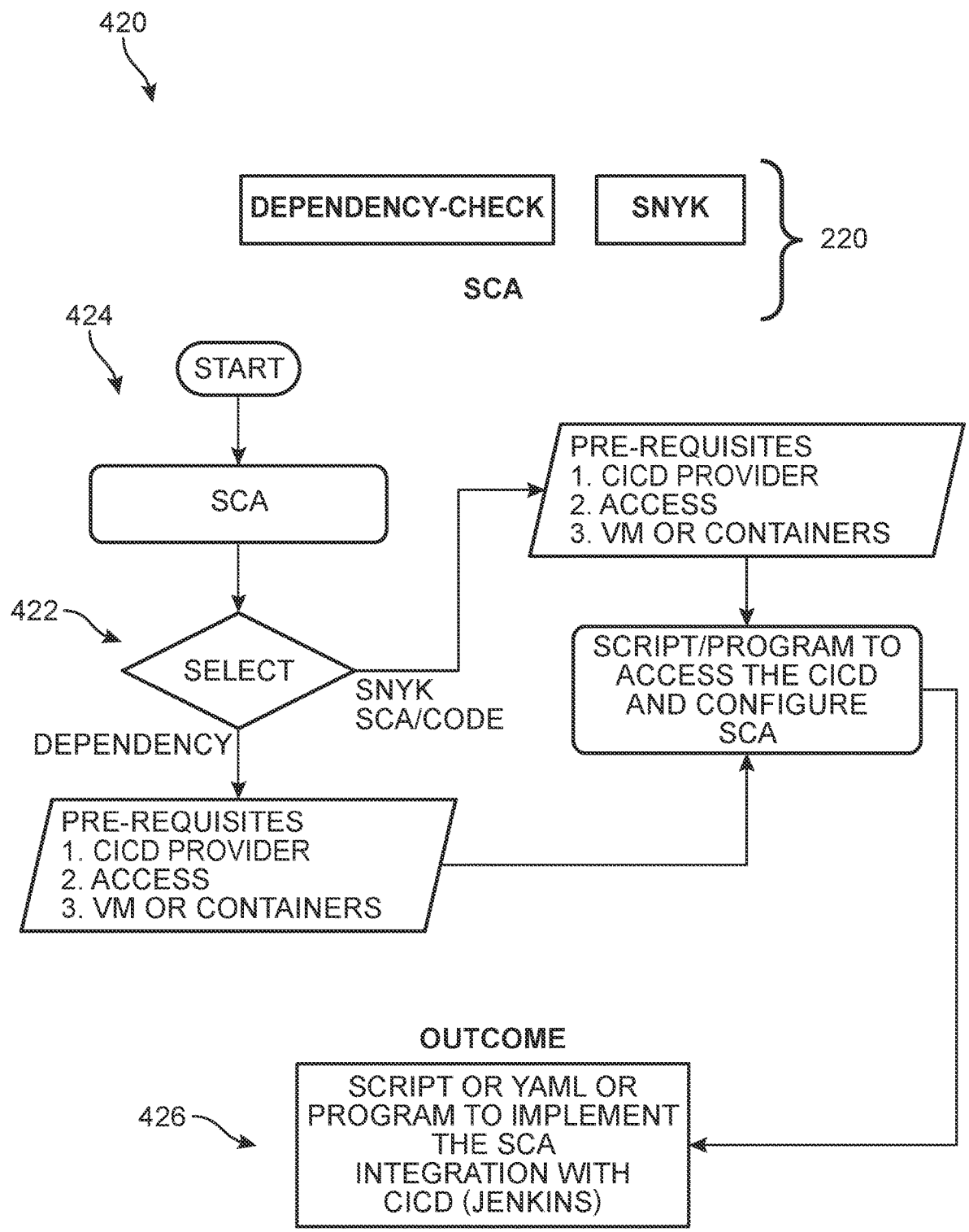
Figure 4C:
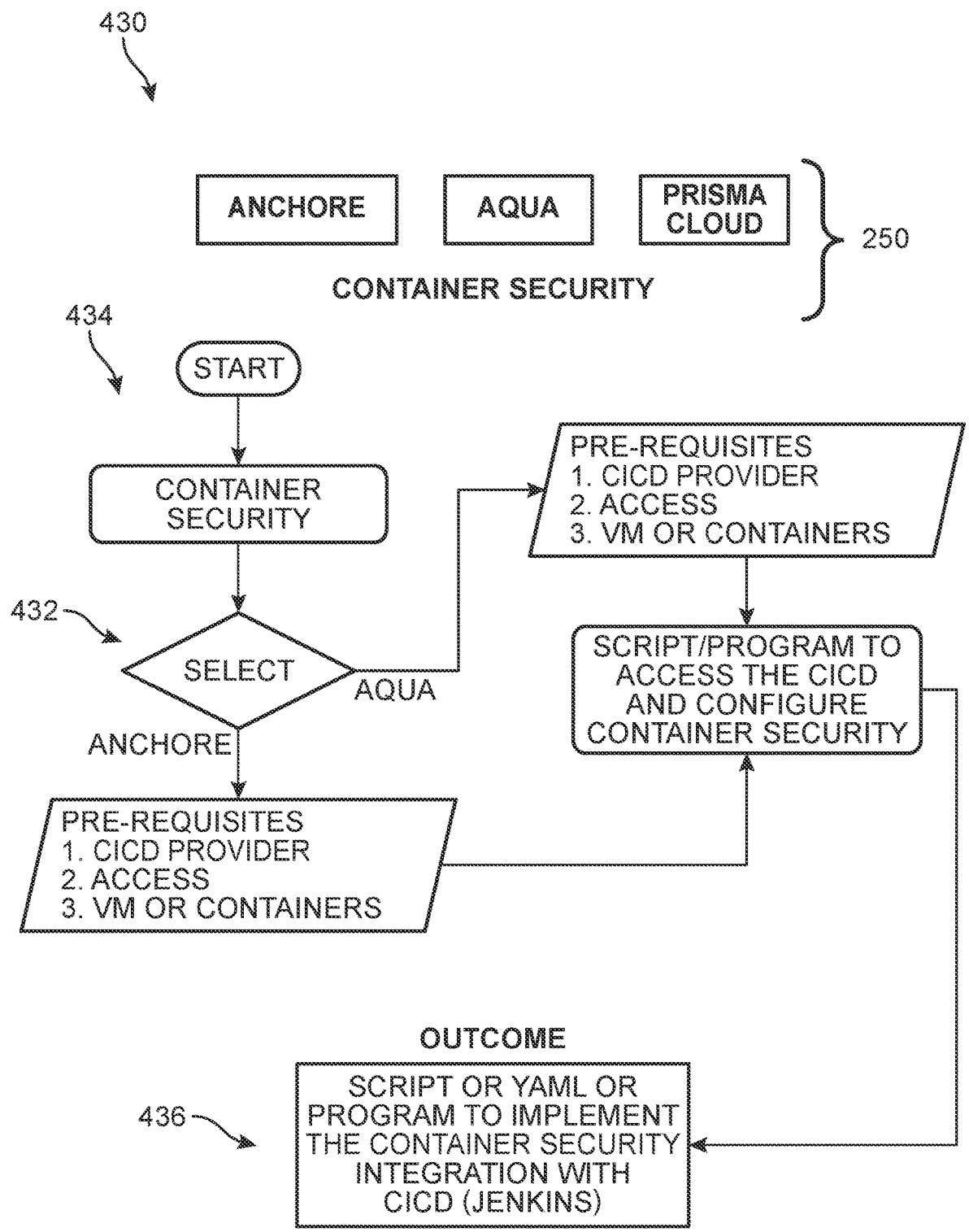

Referring now to FIGS. 4A-4C, additional details regarding the integration process for some of the CI/CD stages during the build security integration phase are illustrated in a series of flow diagrams. In FIG. 4A, a first process 414 for the SAST stage 240 is depicted, where the flow path includes a first branched path 412 at which the security tool integration process can be determined by a selection of either of the two static code analysis platforms. In both the case where SonarQube® is chosen or where Fortify® is chosen, pre-requisites for the integration can include the identification of a CI/CD provider, enabling access to the CI/CD pipeline, and defining the type of a virtual machine (VM) or containers (serverless) that are being used. The script or program can then be given access to the CI/CD pipeline and the DevSecOps integration system can automatically prepare and implement the SAST configuration. A first outcome 416 can include automated generation and integration of a script, YAML, or other program that can implement the selected SAST configuration within the CI/CD pipeline.

In FIG. 4B, a second process 424 for the SCA stage 220 is depicted, where the flow path includes a second branched path 422 at which the security tool integration process can be determined by a selection of either of the two vulnerability and cloud misconfiguration detection platforms. In both the case where Dependency Check® is chosen or where Synk® SCA is chosen, pre-requisites for the integration can include the identification of a CI/CD provider, enabling access to the CI/CD pipeline, and defining the type of a virtual machine (VM) or containers (serverless) that are being used. The script or program can then be given access to the CI/CD pipeline and the DevSecOps integration system can automatically prepare and implement the SCA configuration. A second outcome 426 can include automated generation and integration of a script, YAML, or other program that can implement the selected SCA configuration within the CI/CD pipeline.

In FIG. 4C, a third process 434 for the Container Security stage 250 is depicted, where the flow path includes a third branched path 432 at which the security tool integration process can be determined by a selection of either of two (or more) container security platforms. In both the case where Anchore® is chosen or where Aqua® (or Prisma Cloud®) is chosen, pre-requisites for the integration can include the identification of a CI/CD provider, enabling access to the CI/CD pipeline, and defining the type of a virtual machine (VM) or containers (serverless) that are being used. The script or program can then be given access to the CI/CD pipeline and the DevSecOps integration system can automatically prepare and implement the Container Security configuration. A third outcome 436 can include automated generation and integration of a script, YAML, or other program that can implement the selected Container Security configuration within the CI/CD pipeline.

Figure 5:
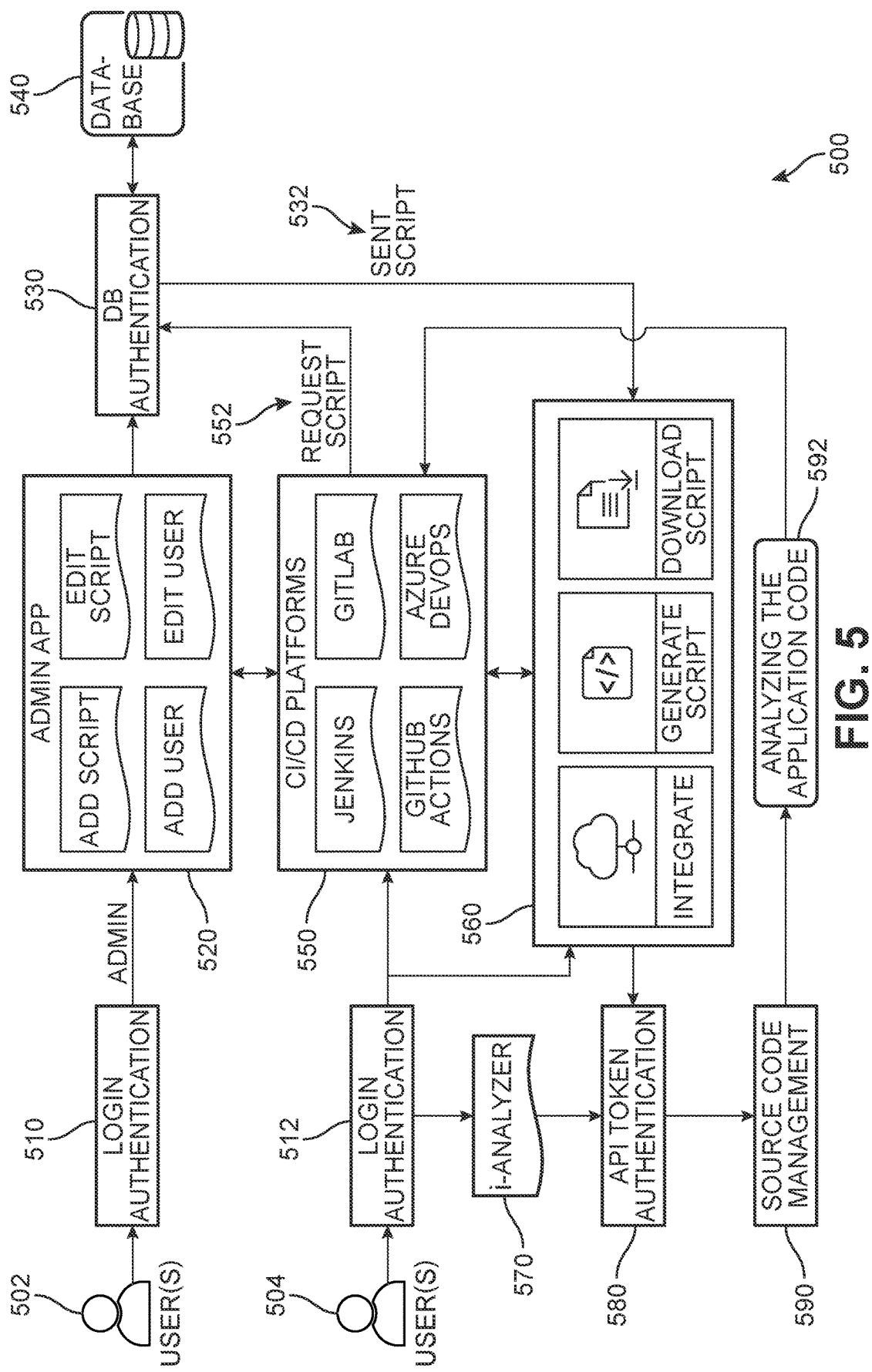
FIG. 5 is a schematic diagram of an embodiment of an environment in which the security integration system can be implemented, according to an embodiment.

FIG. 5 presents a block diagram showing an embodiment of an environment 500 in which the proposed systems can be implemented. Environment 500 can be seen to include a first user(s) 502 and a second user(s) 504. The first user 502 may be understood to correspond to an admin account, which can be verified during a first login authentication event 510. The admin account can be provided access to an admin app 520 (e.g., for adding or editing scripts, users, etc.) which is in further communication with CI/CD platforms 550 (e.g., Jenkins®, GitLab®, GitHub® Actions, Azure® DevOps, etc.). The second user 504, following a second login authentication event 512, can provide the second user 504 access to the CI/CD platforms. In different embodiments, the second user 504 can submit a request for an automated integration of a particular type of security tool based on the selected CI/CD platform being used. An integration analyzer ("i-Analyzer") 570 receives the request, and an API token authentication event 580 occurs, which allows access to a source code management module 590, where a source code repository can be maintained. The application code can be analyzed at 592 and the analysis results sent to the CI/CD platforms 550. The CI/CD platform can then request 552 a script from a database 540 (e.g., MySQL) where preconfigured scripts are stored following a database (DB) authentication event 530. The script can be sent 532 to an integration module 560, which can be configured to generate the script, download the script, and integrate the script into the pipeline.

In different embodiments, the integration analyzer 570 includes an intelligent engine that uses a security resource-selection machine learning model to make selections regarding the security tool that is most appropriate for the pipeline given the source code and file extensions and/or file format. The machine learning model may be trained with historical data (e.g., historical data identifying applications, tools, and security assets provisioned for pipelines, historical data identifying vulnerabilities and computing resources used for execution of the software, the tools, and the assets on the pipeline, historical data relating to performance of the computing resources, etc.) to determine the security tool to be integrated.

Figure 6A:
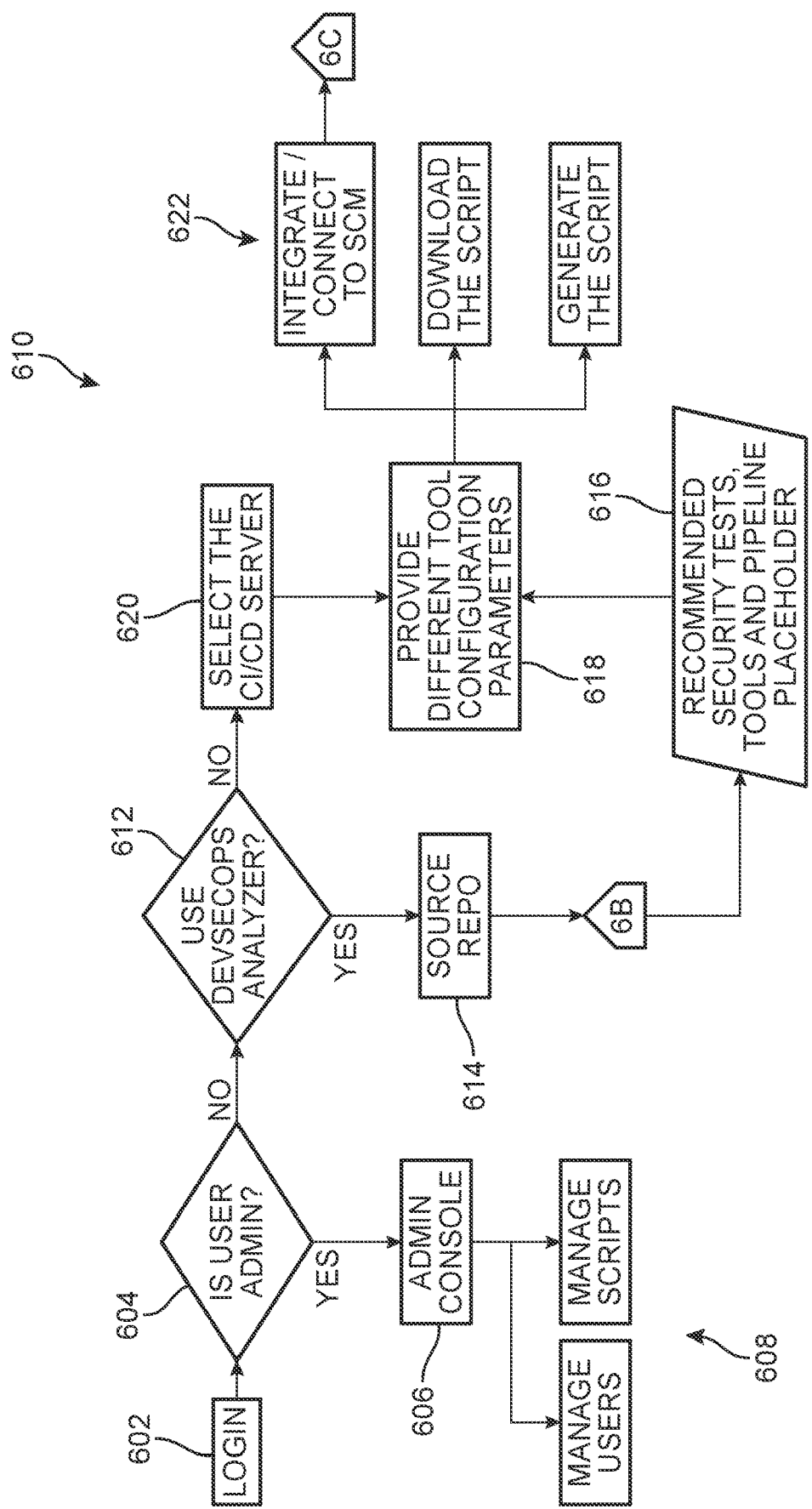
FIGS. 6A-6C depict an overview of a DevSecOps integration system, according to an embodiment.
Figure 6B:
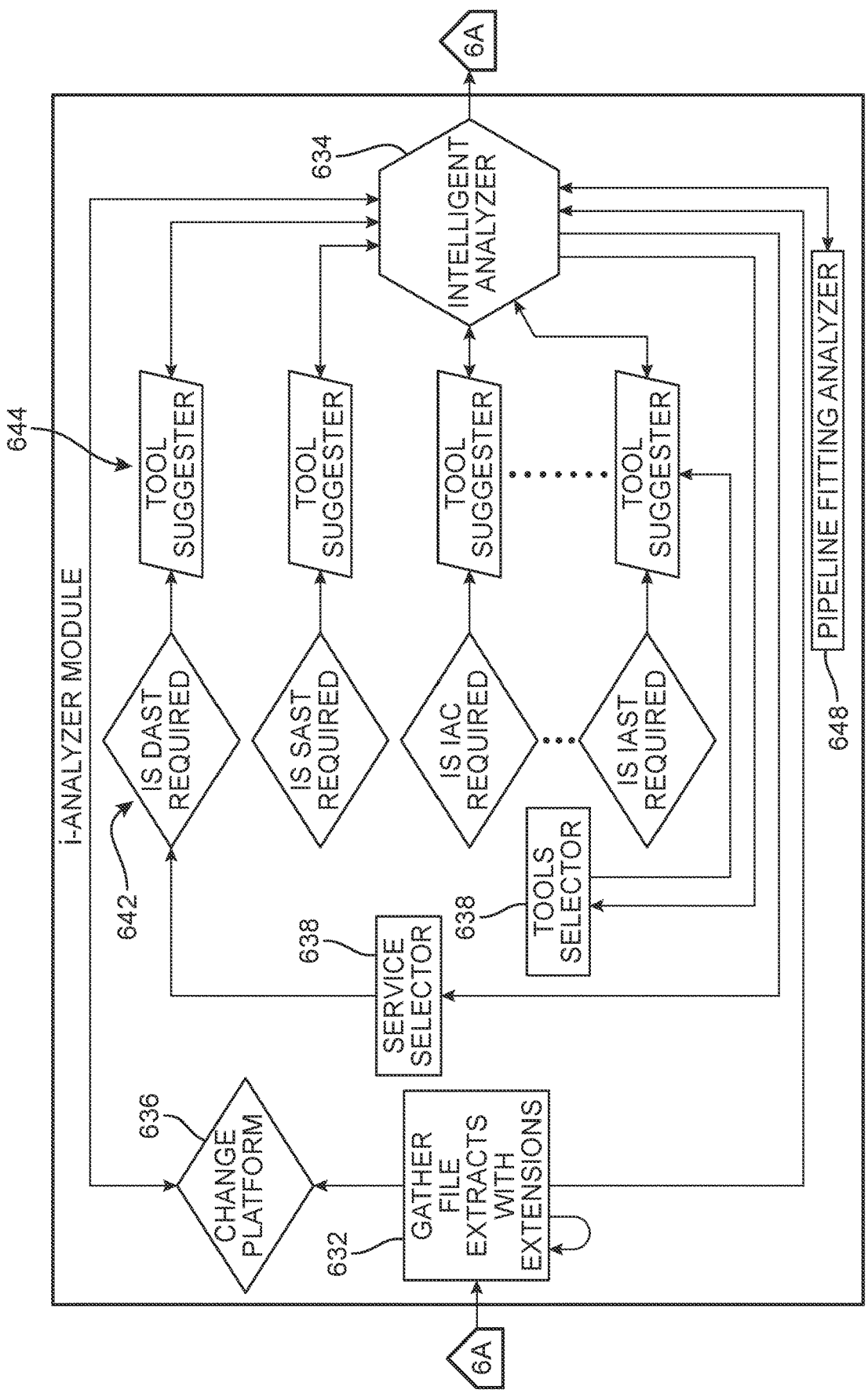
Figure 6C:
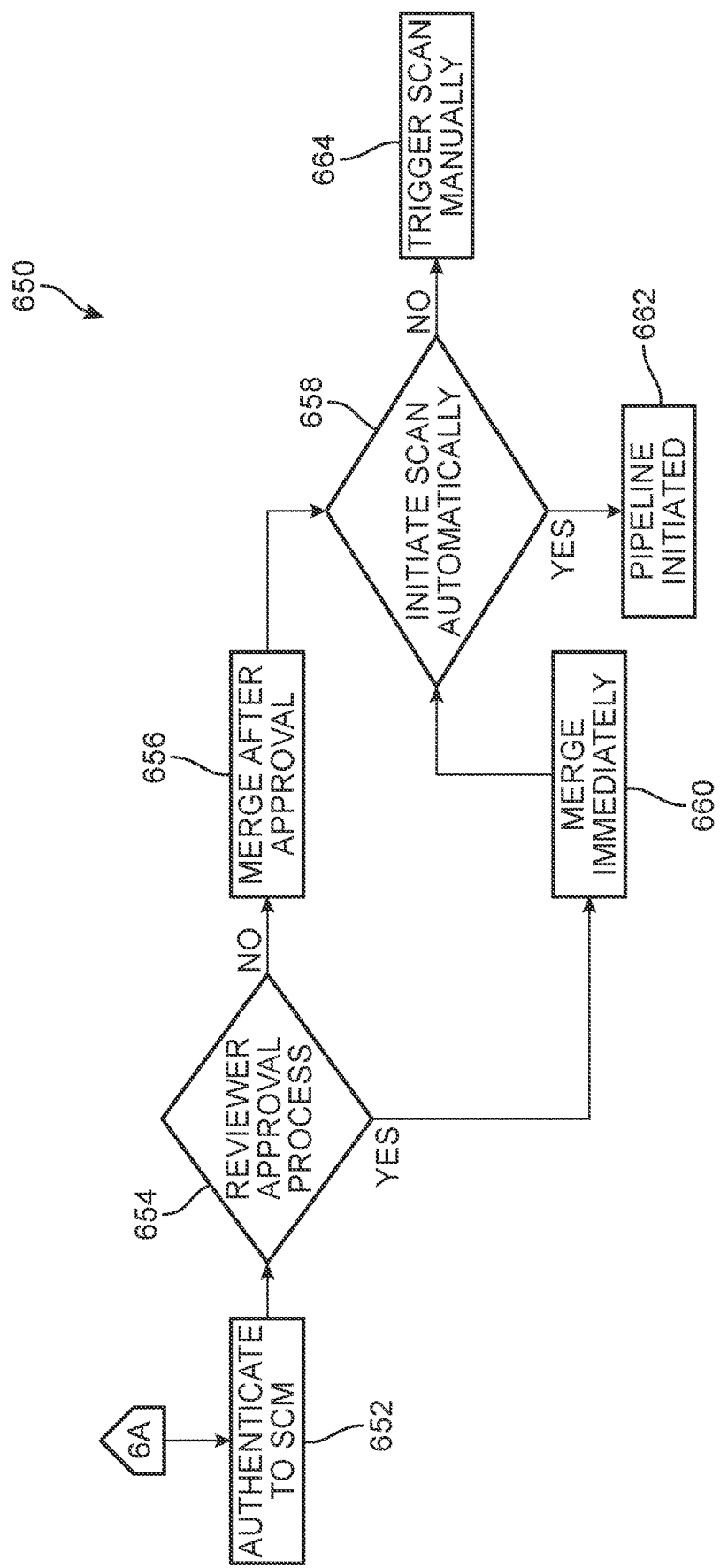

In order to provide a greater understanding of the proposed systems to the reader, FIGS. 6A-6C collectively depict an embodiment of an automated DevSecOps integration system. The system is shown as a series of flow diagram stages, beginning in FIG. 6A, where a user login event 602 occurs. The system can determine whether the login credentials indicate the user is an administrator in a first operation 604. If the user is an administrator, an administrator console 606 can be presented to the user, by which they can manage users and scripts 608. If the user is not an administrator, a second operation 612 can determine whether there is sufficient information for the DevSecOps analyzer to be immediately implemented. If there is insufficient information, the user can initially enter a selection 620 of the CI/CD server that is being used, and provide different tool configuration parameters 618 to the system via the user interface. If there is sufficient information, a target source repository 614 can be accessed, from which activities of an Integration Analyzer module ("i-Analyzer") shown in FIG. 6B can be initiated.

Referring to FIG. 6B, in different embodiments, the i-Analyzer can be configured to, in a third operation 632, gather file extracts with extensions based on the submitted information from the source repository 614. These file extracts are used—if needed—to change platforms in a fourth operation 634, and the file extracts and platform information is shared with an intelligent analyzer engine 634. The intelligent analyzer engine 634 causes a service selector module 638 to move through a sequence of steps corresponding to the stages of the software project development described previously. For example, the service selector 638 can, as the project moves through the pipeline, determine if a DAST security tool is required, and identify a tool via a tool suggester component 644 that can be provided to the intelligent analyzer engine 634. The selections can be iterative, such that for each stage (e.g., SAST, IAC, IAST, etc.) the service selector 638 determines if there is a security tool requirement and then requests a tool to be selected by the corresponding tool selector. The intelligent analyzer engine 634 can make reference to a pipeline fitting analyzer 848 to verify the selected security tool is appropriate, and the intelligent analyzer engine 634 can then generate an output that is returned to the process shown in FIG. 6A.

For example, once a user has provided authorization for the DevSecOps integration system to access the source code, the DevSecOps integration system can identify various file extensions and file structures being used in the repository. Based on the analysis by the logic of the intelligent analyzer engine 634, each function or code type detected (e.g., Azure®, Jenkins®, etc.) in the source code repository can be used to intelligently select a security tool that is appropriate in the context of that portion of the code. The intelligent analyzer engine 634 then automatically generates a customized configuration that implements the suggested tool. In some embodiments, this configuration can be fully automated, and in some other embodiments, there may be additional information sought from the user that can be used to create the integration scripts. As the DevSecOps integration system has a direct connection with the repository based on the credentials provided by the user, the integration scripts for the selected security tool can be directly integrated with the source code at the appropriate location/stage in the pipeline. If the code undergoes any changes, the DevSecOps integration system can detect the modified parameters and, in response, dynamically update or replace the integration scripts to ensure any changes in technologies used in the repository are accommodated. In some embodiments, the integration scripts can be downloaded and manually added to the security as code (SAC), or—in cases where there is authorization and direct connectivity to the repository—the scripts can be pushed directly into the repository and the pipeline can automatically initiate operation of the selected security tool at the appropriate stage in the pipeline without any manual input.

In different embodiments, the intelligent analyzer engine 634 identifies specific phrases, codes, words, file extensions, etc. based on its machine learning model and script templates, to identify where security issues will need to be identified and addressed, and perform an automated integration of specific and appropriate external security tools into the pipeline that will perform such security issue identifications.

Returning to FIG. 6A, an output 616 has been produced by the i-Analyzer of FIG. 6B, which can be used to identify recommended security tests, tools, and generate a pipeline placeholder as needed. This output 616 can then be used to describe different tool configuration parameters 618 to the system. Based on the tool configuration parameters 618, the system can perform a set of operations 622 including automated integration and connection to the SCM, downloading of the appropriate script, and generation of the selected script. The process then moves to operations depicted in FIG. 6C.

In different embodiments, the system can authenticate the connection with the SCM in a fifth operation 652. Once authenticated, in an optional sixth operation 654, a reviewer may be requested to approve the integration process that has been selected. If the reviewer approves, the process, the script can be automatically merged (integrated) immediately with the code in a seventh operation 660. If no approval is received from the reviewer, the merger will be delayed until approval is received in an eighth operation 656. The merger can cause a scan to initiate in a ninth operation 658; such a scan can be initiated automatically, leading to an initiation of the pipeline in a tenth operation 662, or there may be a manual scan that is performed in an eleventh operation 664.

For purposes of clarity to the reader, some non-limiting examples of application programming interfaces (API) that may be offered by the proposed systems are depicted in FIGS. 7, 8, and 9A and 9B. Following a user login and authentication of the user, an API associated with the DevSecOps integration system can allow or request the user to select an integration pipeline type (e.g., Jenkins®, Azure® DevOps, GitLab®, Github® Actions, etc.) from one of the system-supported or recognized integration servers. During this process, the user will be able to view and/or copy the pipeline script, download the pipeline script, and push pipeline script to a repository.

Once the user has selected an integration type—for purposes of this example, "Jenkins"—a configuration panel 700 corresponding to the selection can be presented by the system to the user. The configuration panel 700 displays each stage of the software development, and allows the user to make a tool selection based on the tools that have been deemed appropriate by the DevSecOps integration system for the given parameters. Thus, the user has only to enter relatively little input and/or click boxes in the user interface, and the integration is automatically implemented.

Figure 7:
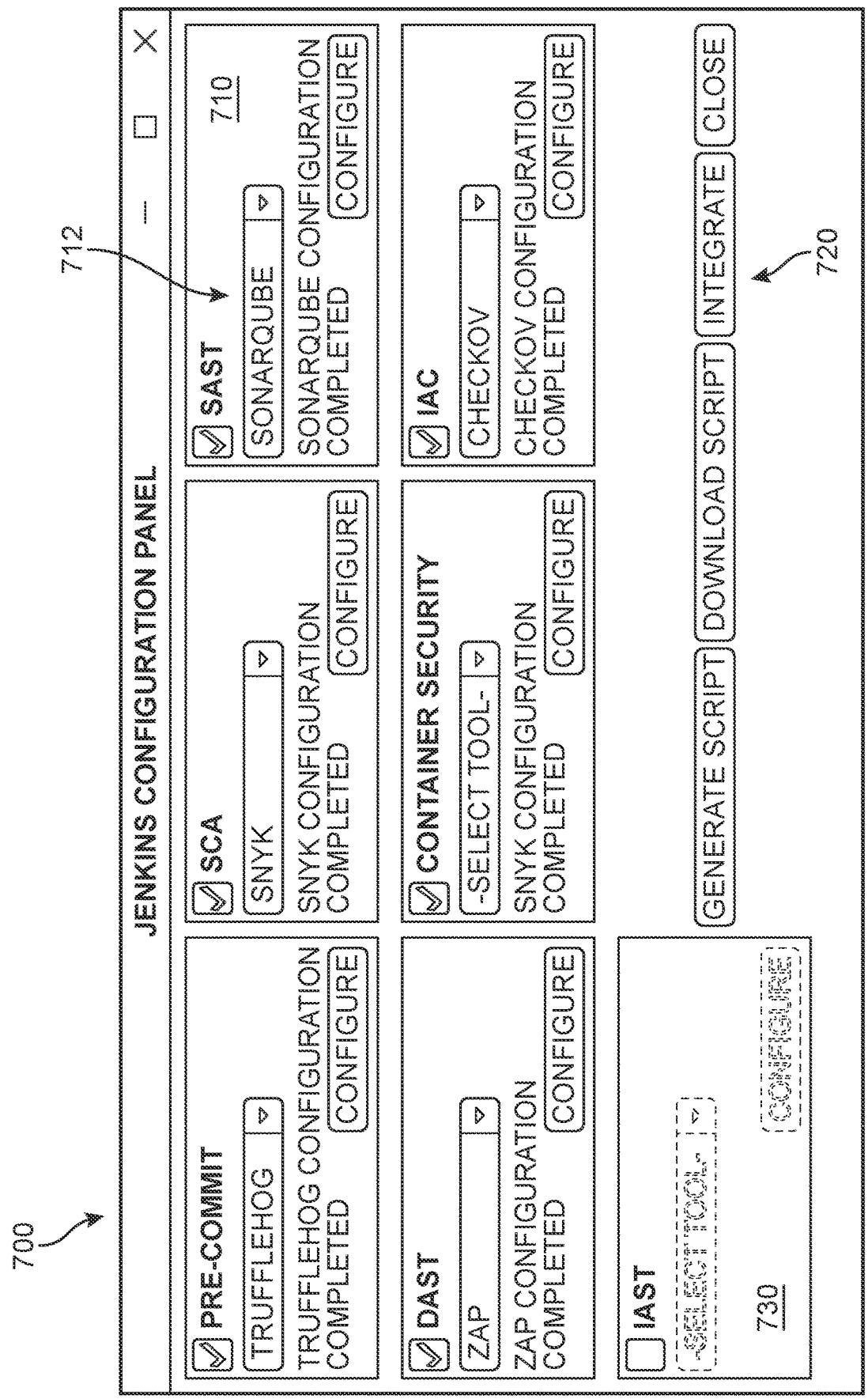
FIG. 7 illustrates an example of a user interface in which stages of a software pipeline in which security tools can be integrated are presented, according to an embodiment.

As shown in FIG. 7, in different embodiments, the selectable items of the user interface may include one or more selectable items representing build stages, one or more selectable items representing source code parameters, one or more selectable items representing tools (e.g., one or more security tools), and/or the like. The selectable items may further include one or more selectable items representing one or more types of platform-as-a-service (PaaS).

In some embodiments, a provisioning platform for the DevSecOps integration system may determine one or more recommended items for a user of the client device based on a profile associated with the user (or a user profile) and provide the one or more recommended items, with the selectable items, in the user interface. For example, the user profile may include information identifying one or more cloud providers, on premises resources, infrastructures, tools, applications, and/or artificial intelligence assets that have been used by the user in the past, have been used by one or more other users, associated with the user (e.g., from a same company, a same organization, etc.), in the past, have been identified as preferred by the user, have been identified as preferred by the one or more other users, and/or the like. The user profile may be stored in a data structure. In some implementation, the user may provide information identifying one or more other users that may access the customized platform and information identifying one or more other client devices that may be used to access the customized platform. The information identifying the one or more other users and the one or more other clients may be included in another user profile associated with the customized platform. The DevSecOps integration system may generate the other user profile during or subsequent to provisioning of the customized platform.

In different embodiments, cloud providers may include one or more providers of cloud computing services that may be used for implementing the customized platform. The on-premise resources may include one or more resources that may be located at a user location of a user of the client device and that may be used by the user for implementing the customized platform. For example, the one or more resources may include one or more devices at the user location. The infrastructures may include one or more devices that are used for implementing the customized platform. The infrastructures may provide data processing capabilities, data collection capabilities, data storage capabilities, network setup capabilities, and/or the like. The infrastructures may include bare metal infrastructures that may act as a base for a development environment, a DevOps environment, and/or application servers. The infrastructures may provide the ability to capitalize on container technology, curtail effort and expense on data processing capabilities, provide tools that collect data, set up complex networks and storage, and/or the like. The tools may include one more software tools that may be used for implementing the customized platform. For example, the tools may be used to customize a DevOps platform. The tools may include open-source software tools. In some implementations, multiple tools may be selected to customize a DevOps platform. The multiple tools may be selected based on a single input from a user via the client device. In other words, the DevSecOps integration system may provide a "one-click" solution for selecting multiple tools.

In some embodiments, applications may include one or more applications that may be used for implementing the customized platform. The applications may run on one or more of the infrastructures to implement the customized platform. The applications may be associated with different DevOps technologies. In some implementations, the applications may be preconfigured with one or more software tools. In some implementations, multiple applications may be selected as a bundle of software associated with a DevOps template (e.g., to implement a customized DevOps platform). The DevOps template may include a continuous integration and continuous deployment template. The artificial intelligence assets may include one or more artificial intelligence models that may be used for implementing the customized platform. For example, the one or more artificial intelligence models may be used for implementing the customized platform by way of automation, recommendation, and/or prediction in conjunction with a machine learning model. The artificial intelligence assets may enable accurate prediction and increased speed in decision making, through machine learning and artificial engineering, to implement a customized DevOps platform.

Thus, in different embodiments, the DevSecOps integration system may receive, from the client device, provisioning data selected from the user interface and identifying a cloud provider or on-premise resources, an infrastructure, a type of PaaS, one or more applications, one or more tools, and/or one or more artificial intelligence (AI) assets for provisioning the customized platform. For example, the client device may select, from the user interface, information identifying a cloud provider or on-premise resources, an infrastructure, one or more applications, one or more tools, and/or one or more artificial intelligence (AI) assets as provisioning data and may transmit the provisioning data to the DevSecOps integration system. In some implementations, the selections of the client device may be used to customize a template to create a customized template, which customized template may be executed to create a customized platform, as explained in more detail below.

In some embodiments, the DevSecOps integration system may receive, from the client device, data indicating that one of the selectable items of the user interface is selected. The DevSecOps integration system may update the user interface, to generate an updated user interface, based on the data indicating that one of the selectable items of the user interface is selected, and provide the updated user interface to the client device. For example, the user interface may be updated to include information indicating that the one of the selectable items of the user interface has been selected.

In some embodiments, the DevSecOps integration system may receive, from the client device along with the provisioning data, information identifying the user (e.g., a username, an identifier, and/or the like of the user), information identifying the client device (e.g., a name, a network address such as a media access control (MAC) address, and/or the like of the client device), the information identifying the one or more other users (e.g., usernames, identifiers, and/or the like of the one or more other users), the information identifying one or more other client devices (e.g., names, network addresses such as MAC addresses, and/or the like of the one or more other client devices, and/or the like), and/or the like. In some embodiments, the DevSecOps integration system may generate information identifying the customized platform (e.g., a name, an identifier, and/or the like) based on receiving the provisioning data. The DevSecOps integration system may associate the information identifying the customized platform with the information identifying the user, the information identifying the client device, the information identifying the one or more other users, and/or the information identifying the one or more other client devices.

In some embodiments, the DevSecOps integration system may receive, from the client device, credentials of the user associated with the client device. The credentials may be used to authenticate the user to access computing resources associated with the cloud provider. In some implementations, after receiving the provisioning data from the client device, the DevSecOps integration system may prompt the user, via the user interface, for information that may be used to authenticate the user to access the computing resources associated with the cloud provider. Based on the prompt, the user may submit the credentials via the user interface and the DevSecOps integration system may receive, from the client device, the credentials submitted via the user interface. The credentials may include a username, a password, a passcode, a biometric, and/or the like of the user. In some embodiments, after receiving the credentials, the DevSecOps integration system may validate and encrypt the credentials and securely store the credentials in a credential vault after validation and encryption. Accordingly, the DevSecOps integration system may provide a two-tier security to ensure safekeeping of the credentials. The credentials (after validation and encryption) may be stored, in the credential vault, in association with the information identifying the user and/or the information identifying the client device.

In some embodiments, the DevSecOps integration system may validate the credentials by determining whether the credentials include a particular combination of alphanumeric characters, a particular biometric, and/or the like. The DevSecOps integration system may cause the credentials to be encrypted by way of an application program interface (API) call. For instance, the API call may cause the credentials to be encrypted using one or more keys (or cryptographic keys). In some implementations, the one or more keys may be associated with a key management service. For example, the DevSecOps integration system may use the key management service to manage (e.g., create and/or protect) cryptographic keys used to encrypt information that is used as part of provisioning pipeline. The credential vault may include a data structure that is used to store encrypted credentials that are used to access pipeline.

In some embodiments, the DevSecOps integration system may process the provisioning data to identify conflicting and/or redundant (or duplicate) applications, tools, and/or assets included in the provisioning data. For example, the DevSecOps integration system may compare information regarding one or more tools (identified in the provisioning data) and information regarding one or more applications (identified in the provisioning data), compare the information regarding the one or more tools and information regarding one or more assets (identified in the provisioning data), and/or compare the information regarding the one or more applications and the information regarding the one or more assets. For instance, the DevSecOps integration system may compare identifiers of the one or more tools and identifiers of tools that are included as part of the one or more applications, compare a description of the one or more tools and a description of the tools of the one or more applications, compare a function or a purpose of the one or more tools and a function or a purpose of the tools of the one or more applications, compare the description of the one or more tools and a description of the one or more assets, compare the function or the purpose of the one or more tools and a function or a purpose of the one or more assets, compare the description of the one or more applications and the description of the one or more assets, and/or the like.

The DevSecOps integration system may identify the conflicting and/or redundant applications, tools, and/or assets based on results of the comparisons. For example, the DevSecOps integration system may determine that the one or more tools are conflicting with respect to the one or more applications if the one or more tools are incompatible with the one or more applications. Additionally, or alternatively, the DevSecOps integration system may determine that the one or more tools are redundant with respect to the one or more applications if the one or more applications include the one or more tools or include tools similar to the one or more tools (e.g., perform a similar function as the one or more tools). Additionally, or alternatively, the DevSecOps integration system may determine that the one or more assets are conflicting with respect to the one or more applications if the one or more assets are incompatible with the one or more applications. The comparisons and the determinations above are provided merely as examples. Other examples may differ from what is described with regard to the comparisons and the determinations above.

In some embodiments, the DevSecOps integration system may provide, to the client device and via the user interface, a notification identifying the redundant tools that are to be removed. The user may submit, via the user interface and in response to the notification, information indicating approval to remove one or more of the redundant tools and the DevSecOps integration system may receive an indication, from the client device, indicating the approval to remove the one or more of the redundant tools. The DevSecOps integration system may then remove information regarding the one or more of the redundant tools from the provisioning data based on the indication and generate the updated provisioning data based on the removal.

The techniques used to identify the one or more replacement applications, tools, and/or assets discussed above are provided merely as examples. Other examples may differ from what is described with regard to the techniques described above. In some embodiments, the DevSecOps integration system may provide, to the user of the client device, notifications indicating a status of configuring the computing resources. The DevSecOps integration system may transmit the notifications to the client device for display via the user interface. Additionally, or alternatively, the DevSecOps integration system may transmit the notifications to the user via different messaging methods including, for example, email or text message. As an example, the notifications may indicate whether the configuring is in progress, whether the configuring has been successfully completed, whether the configuring has failed, an availability of each computing resource, and/or the like. The DevSecOps integration system may transmit similar notifications regarding a status of executing the applications, a status of executing the tools, a status of executing the Assets, and/or a status of creating the customized platform in a manner similar to the manner described above.

In some implementations, when executing a customized script template, the DevSecOps integration system may generate a container and may execute the customized template, via the container, to provision the software with the security applications, the tools, and/or the assets and to create the customized integrated platform. The DevSecOps integration system may obtain a container image, from a container image repository, and generate the container using the container image. Containers may be used to isolate provisioning of each customized platform for each user of a plurality of users. In this regard, the DevSecOps integration system may enable simultaneous provisioning of pipeline for multiple users by using containers. For example, the DevSecOps integration system may enable a same application to be provisioned simultaneously for multiple users by executing customized templates via containers. As an example, each provisioning may cause a new container to be created. The DevSecOps integration system may enable an application to be deployed via multiple cloud provider resources and/or on-premise resources.

Additionally, or alternatively, the DevSecOps integration system may cause an application program interface (API) to be called to generate and provide a user interface of the customized platform (e.g., to the client device). In some implementations, the DevSecOps integration system may store the provisioning data and/or the updated provision data (e.g., information regarding the applications, tools, and/or the like) in a data structure associated with the customized platform. Additionally, during the remote execution, the real-time status (including any updates) of the provisioning of the customized platform may be provided via the user interface (provided by the DevSecOps integration system to the client device). Additionally, the DevSecOps integration system may provide a notification (e.g., email and/or text message), to the user via the user interface, regarding the real-time status along with the customized platform credentials.

In this way, several different stages of the process for generating and deploying a customized platform for selected applications, tools, and artificial intelligence assets are automated, which may remove human subjectivity and waste from the process, and which may improve speed and efficiency of the process and conserve computing resources (e.g., processing resources, memory resources, communication resources, and/or the like), networking resources, human resources, resources costs (as discussed herein), and/or the like. Additionally, implementations described herein may enable multiple ways of provisioning/configuring pipeline and the pipeline may be associated with multiple DevOps platform technologies. Furthermore, implementations described herein use a rigorous, computerized process to perform tasks or roles that were not previously performed or were previously performed using subjective human intuition or input. Finally, the process for automatically generating and provisioning a custom-configured set of security tools for selected applications, tools, and assets conserves computing resources, networking resources, and/or the like that have would otherwise have been used to manually process (e.g., identify, install, configure, and/or the like) required infrastructure, applications, tools, and/or the like for a DevOps platform; identify misconfigurations in the DevOps platform, correct the misconfigurations in the DevOps platform, and/or like. In other words, the DevSecOps integration system may provide a "one-click" solution for selecting a security tool.

Figure 8:
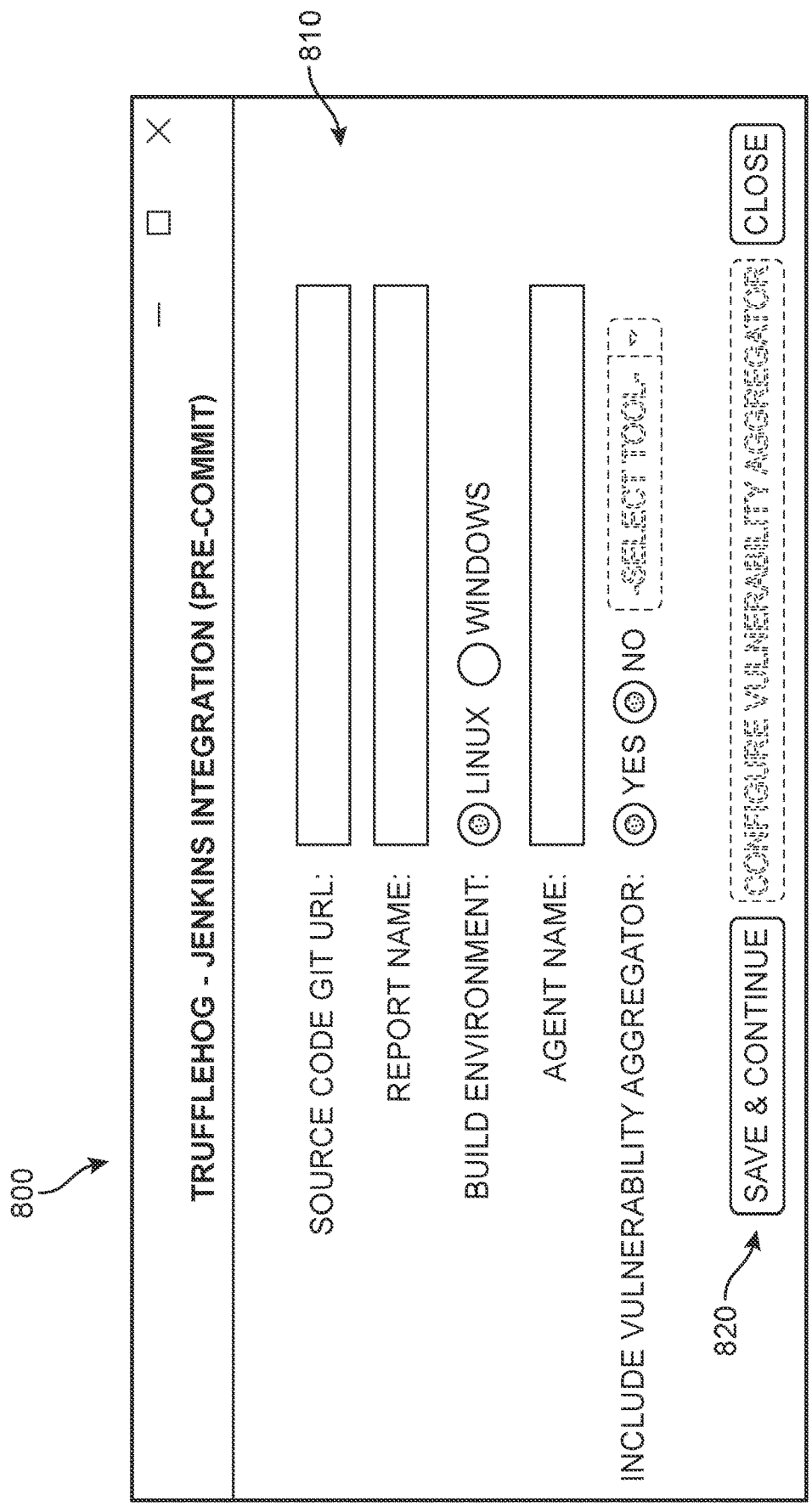
FIG. 8 is an example of a user interface in which source code data can be submitted by a user to the integration system, according to an embodiment.

In FIG. 7, each of the stages is shown in a stage panel 710, including Pre-Commit, SCA, SAST, DAST, Container Security, IAC, and IAST. Each stage panel 710 includes a drop-down menu 712 (or other selectable listing of options relevant to the given stage) that allows for a selection of the security tool desired by the user. As each selection is made, a new user interface may be presented to the user as a pop-up or a new page. One example is shown in FIG. 8 where, following selection of the Trufflehog® tool in the Pre-Commit stage panel, a follow-up panel 800 is shown that is directed to collecting information needed to prepare the configuration. In FIG. 8, the user can enter information such as a source code Git URL, a report name, a build environment (e.g., Linux® or Windows®), an agent name, and whether the pipeline should implement a vulnerability aggregator (as well as which type). In some cases, additional SCM connector information can be submitted, including the Git repository URL, user name, password/API token, and a local repository folder. This information is saved and a new interface can be shown in which a script to configure is shown, which can then be automatically integrated into the pipeline at the appropriate location. Returning to FIG. 7, as each integration is performed, the stage panel view can be updated by the system (e.g., "Trufflehog configuration completed"). In cases where a stage is not selected, such as IAST stage panel 730, the configuration may not be performed.

In other words, with respect to a specific stage such as "pre-commit. in different embodiments, the DevSecOps integration system scans the source code to ensure that a security tool (e.g., Trufflehog®) is integrated into the pipeline to ensure that any confidential information linked to the source code is protected. The DevSecOps integration system can analyze the code to determine what the build is based on (e.g., Java®, Maven®, etc.) and generates a specific integration to the selected tool. The DevSecOps integration system allows this to occur even if the developer or other user does not understand these technologies or lacks awareness of the security issues that may be associated with their source code. In one example, only the URL for the source code may be needed for the DevSecOps integration system to perform the integration. In some embodiments, the DevSecOps integration system automatically integrates a ready-made script based on a template that has been stored for such deployments, and pushes this script into the repository. In some embodiments, a scanner in the repository when activated can automatically initiate operation of the selected security tool at the appropriate stage in the pipeline without any manual input and cause the security tools to work in tandem with the pipeline operations, including source code analysis, dynamic application security testing, container security, etc.

In different embodiments, the DevSecOps integration system can determine a location in the pipeline in which to integrate the security script using templating techniques. In other words, each script that is generated can be added as a template, and the templates are inserted (e.g., pushed, uploaded, etc.) into the main script (e.g., as a snippet) in the repository into the correct build stage and then automatically integrated (merged) to become part of the source code. This process thus ensures the correct security tool is added at the appropriate stage in the pipeline. In some embodiments, once the file extensions and other parameters in the source code are identified, the system selects a template(s) corresponding to a designated security tool to generate the automated script for the integration of the selected security tool. Thus, in some embodiments, the DevSecOps integration system may utilize one or more of a set of templates, storied in a template database, when provisioning and configuring the set of security tools. In some embodiments, the template database can refer to a relational database, such as Oracle or DB2, implemented on an enterprise database server, or virtual server. In some implementations, the script templates are a standardized form for automation, which may be employed in keyword driven, data driven and/or hybrid automation frameworks. In some implementations, the script templates are standard or proprietary templates defined by an automation tool, such as Tricentis Tosca®. In one example, the script template is selected based on the source code file extensions for which the integration script is being generated. The set of templates may specify particular Dev-Ops and security tool configurations. For example, different configurations of an automation security tool may be created using different templates, such that one of the templates may be used to implement a specific configuration of the security tool within the one or more environments.

In different embodiments, in order to allow the user to remain abreast of the operations performed by the DevSecOps integration system, a visualization dashboard can be made available that summarizes and reports on the system integration processes. For example, in FIGS. 9A and 9B, a dashboard 900 is presented that offers a high-level overview of the stage build history. In this example, the dashboard 900 includes a plurality of columns, each corresponding to a stage in the software lifecycle, with information for each build as selected from a build history listing 912. The columns in FIG. 9A include a declarative checkout stage 910, a pre-commit stage 920, an SCA stage 930, a Synk-Jira stage 940, a SAST stage 950, a DAST stage 960, and a Synk-container scan stage 970. The columns continue in FIG. 9B, including a Checkov stage 980, a Checkov Scan stage 990, and a Defect Dojo stage 992.

Figure 9A:
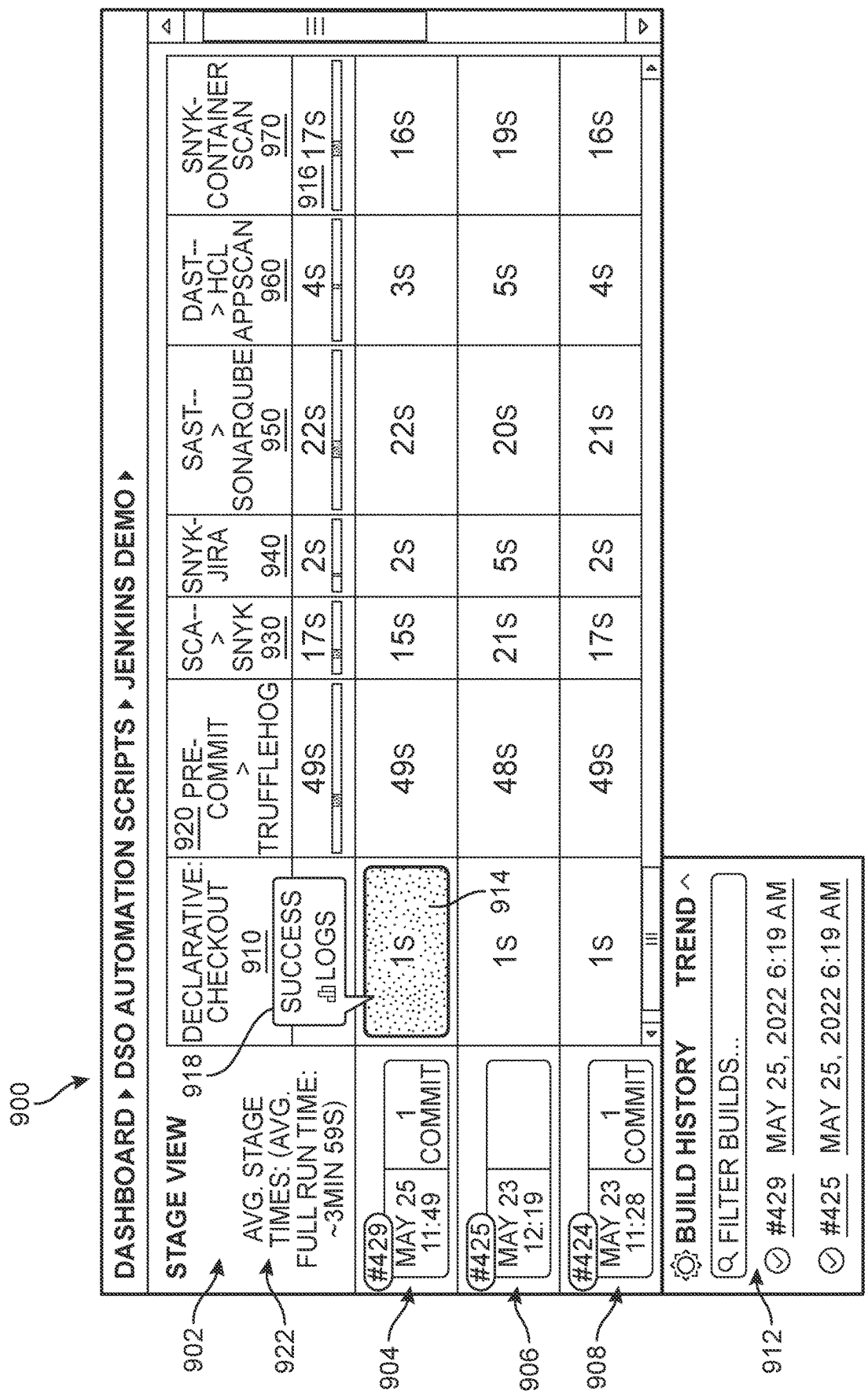
FIGS. 9A and 9B collectively depict an example of a visualization dashboard for the security integration system, according to an embodiment.
Figure 9B:
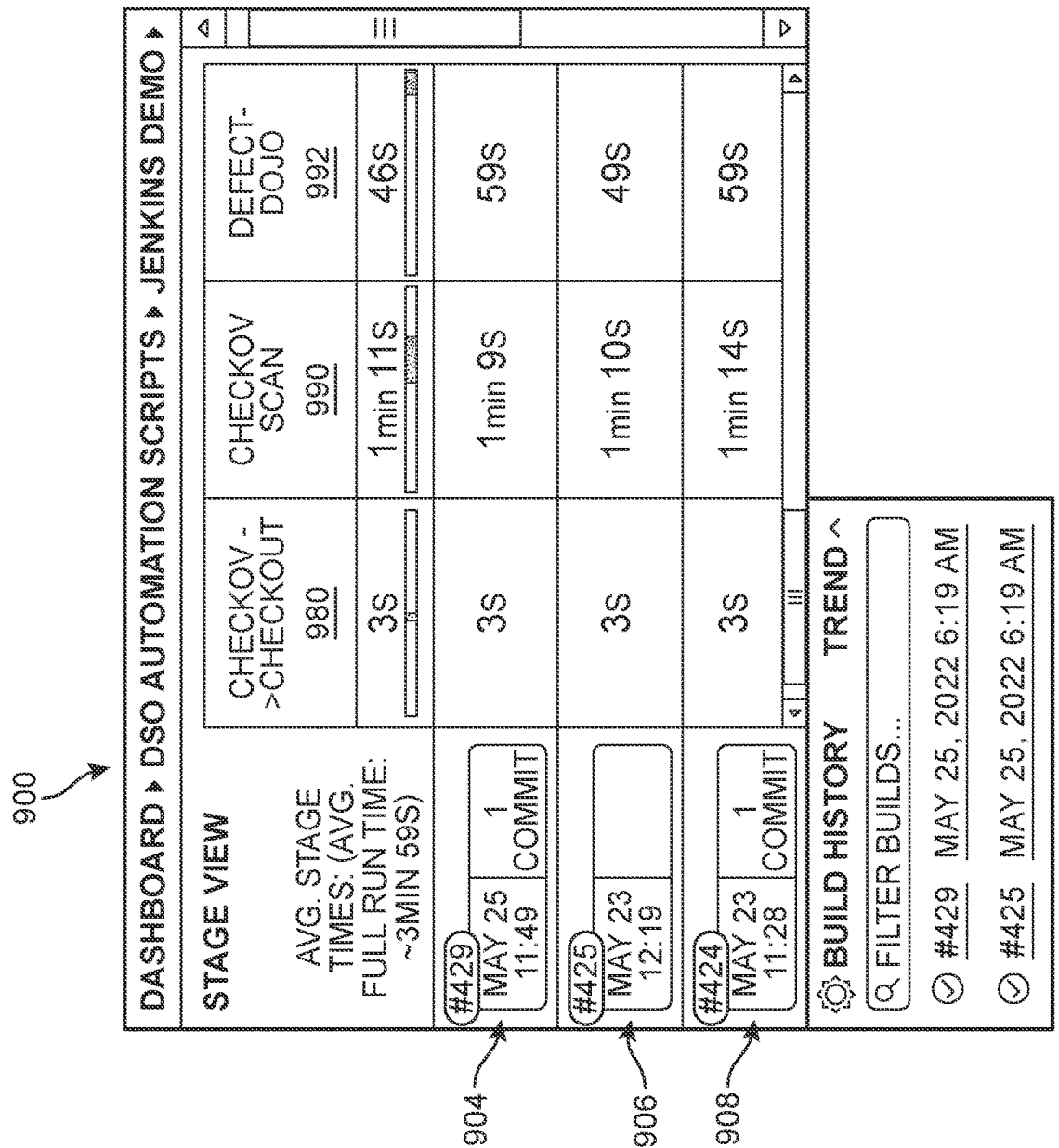

In FIGS. 9A and 9B, a stage view panel 902 presents data associated with each of these stages for three builds that occurred at three different times, including a first build 904, a second build 906, and a third build 908. Each set of data for a build is presented as a row. An average stage time 922 for all of the builds is also presented above the three rows. In each row, for each of the stages, a duration 914 is identified that corresponds to the time that was needed to perform each stage integration. In some embodiments, the dashboard 900 is interactive and users can select different data items for further information about the stage and the integration, including logs of each operation.

Figure 10:
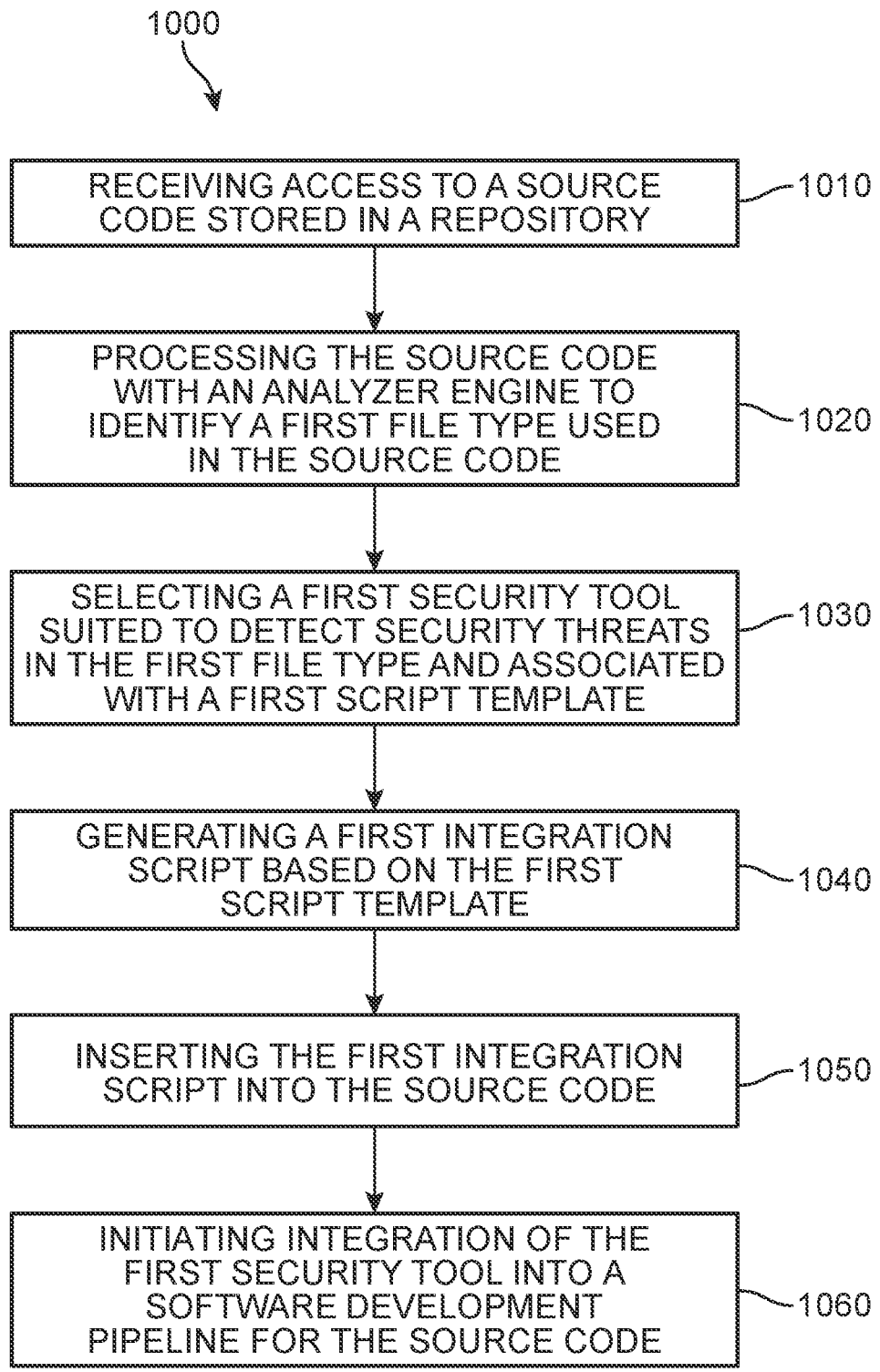
FIG. 10 is a flow chart depicting a method of automatically integrating security tools into a DevOps pipeline, according to an embodiment.

FIG. 10 is a flow chart illustrating an embodiment of a computer-implemented method 1000 of automatically integrating security tools into a DevOps pipeline. The method 1000 includes a first step 1010 of receiving, by a security integration system and from a client device, access to a source code stored in a repository. A second step 1020 includes processing, by the security integration system, the source code with an analyzer engine (module) to identify a first file type used in the source code. A third step 1030 includes automatically selecting, by the security integration system and in response to identification of the first file type, a first security tool suited to detect security threats in the first file type, the first security tool associated with a first script template. In addition, the method 1000 includes a fourth step 1040 of automatically generating, by the security integration system, a first integration script based on the first script template, and a fifth step 1050 of inserting, from the security integration system, the first integration script into the source code. Furthermore, the method 1000 includes a sixth step 1060 of automatically initiating integration of the first security tool into the DevOps pipeline for the source code.

In other embodiments, the method may include additional steps or aspects. In one example, the method also includes a step of determining, via the analyzer engine, a first build stage in which the first file type is used, and causing integration of the first security tool to occur in the first build stage of the DevOps pipeline. In another example, the method includes another step of providing, via the security integration system, a user interface that includes selectable items associated with automatic provisioning and configuring of security tools to a DevOps pipeline. In some embodiments, the method can include a step of receiving, at the security integration system, a first user input, wherein the first user input is used to authenticate each access session from the security integration system with the repository.

In some embodiments, the method can also include steps of processing, by the security integration system, the source code with the analyzer engine, to identify a second file type used in the source code, selecting, by the security integration system, a second security tool suited to detect security threats in the second file type, the second security tool associated with a second script template, generating, by the security integration system, a second integration script based on the second script template, pushing, from the security integration system, the second integration script to the repository, thereby inserting the second integration script into the source code, and automatically initiating integration of the second security tool into the DevOps pipeline for the source code. In one example, the method can also include determining, via the analyzer engine, a second build stage in which the second file type is used, the second build stage differing from the first build stage, and causing integration of the second security tool to occur in the second build stage of the DevOps pipeline. In another example, the method also includes presenting a user interface that includes an interactive visualization dashboard depicting each stage detected in the source code and one or more security tools supported by the security integration system that can be integrated into each stage.

Figure 11:
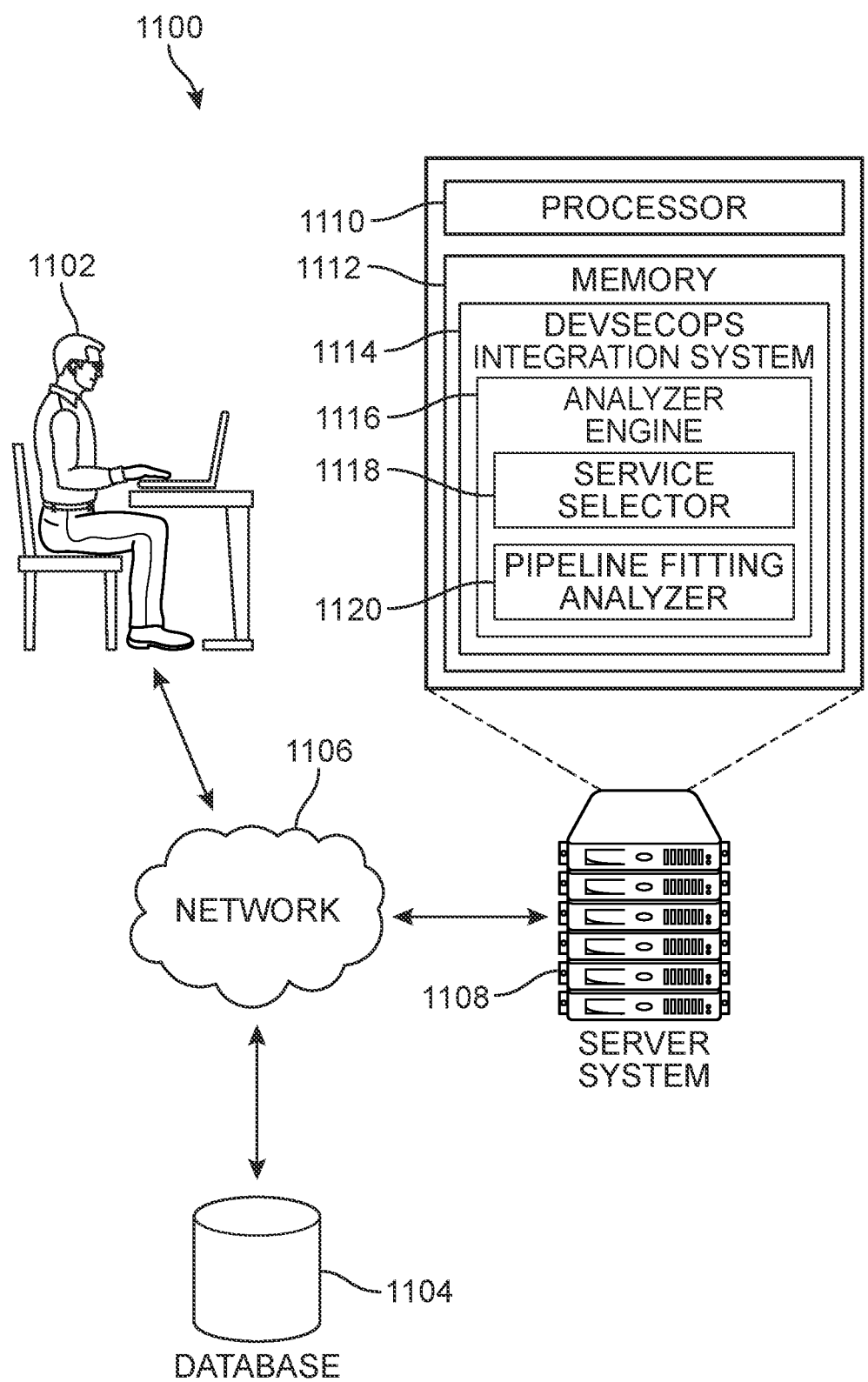
FIG. 11 is a diagram depicting example environments and components by which systems and/or methods, described herein, may be implemented.

FIG. 11 is a schematic diagram of an environment 1100 for a security (DevSecOps) integration system 1114 (or simply, system 1114), according to an embodiment. The environment 1100 may include a plurality of components capable of performing the disclosed method of security tool integration (e.g., method 1000 above). For example, environment 1100 includes a user device 1102, a computing/server system 1108, and a database 1104. The components of system 1100 can communicate with each other through a network 1106. For example, user device 1102 may retrieve information from database 1104 via network 1106. In some embodiments, network 1106 may be a wide area network ("WAN"), e.g., the Internet. In other embodiments, network 1106 may be a local area network ("LAN").

As shown in FIG. 11, components of the system 1114 may be hosted in computing system 1108, which may have a memory 1112 and a processor 1110. Processor 1110 may include a single device processor located on a single device, or it may include multiple device processors located on one or more physical devices. Memory 1112 may include any type of storage, which may be physically located on one physical device, or on multiple physical devices. In some cases, computing system 1108 may comprise one or more servers that are used to host the automated integration system.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape.

While FIG. 11 shows one user device, it is understood that one or more user devices may be used. For example, in some embodiments, the system may include two or three user devices. In some embodiments, the user device may be a computing device used by a user. For example, user device 1102 may include a smartphone or a tablet computer. In other examples, user device 1102 may include a laptop computer, a desktop computer, and/or another type of computing device. Embodiments may also include one or more computers and one or more storage devices storing instructions that are operable, when executed by the one or more computers, to cause the one or more computers to perform the disclosed method. The user devices may be used for inputting, processing, and displaying information.

Referring to FIG. 11, environment 1100 may further include database 1104, which stores template data, machine learning model training data, and/or other related data for the system, as well as external data. This data may be retrieved by other components for system 1114. As discussed above, system 1114 may include an analyzer engine 1116, a service selector 1118, and a pipeline fitting analyzer 1120. Each of these components may be used to perform the operations described herein.

Features, aspects, tools, components, modules, and other elements of embodiments of the disclosed system can also be found in U.S. Pat. No. 11,190,399B2 to Kabbinale et al., granted on Nov. 30, 2021 and titled "Automatically generating and provisioning a customized platform for selected applications, tools, and artificial intelligence assets", the application of which is hereby incorporated by reference in its entirety.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus can include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud infrastructure environment may provide computation, software, data access, storage, etc. services that do not require end-user knowledge of a physical location and configuration of system(s) and/or device(s) that hosts the policy management service. For example, a cloud computing environment may include a group of infrastructure resources (referred to collectively as "computing resources" and individually as "computing resource").

Cloud infrastructure resources includes one or more database, virtual private networks, server devices, or other types of computation and/or cloud resources. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment 222, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition to the algorithms and techniques described above, one or more of the following techniques may be utilized by one or more of the disclosed embodiments: RPA, Mongo DB, AI Modules such as Python, Image to Text, OCR, Computer Vision, Image comparison (phase comparison), Image Validation (image to text, then text to text comparison), Learning Algorithms, Similarity Analytics, Sequencing algorithms, Random Forest, gCNN, Data Clustering with weighted data, Data Visualization, Rocket Chat, and D3JS.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources can generally be managed by a server and data storage system maintained by a platform provider, as opposed to computers within the actual client (tenant) businesses themselves. In addition, a Cloud Service Provider (CSP) may include an organization that provides a cloud computing resource to a client device and/or a user of a client device. Furthermore, the term "component" refers to software applications and other system modules and features comprising or supporting the multi-tenant architecture.

In one implementation, the cloud infrastructure test automation systems described herein include hardware data storage. Among other operational data, the hardware data storage may store instantiation rules and instantiation metadata. Instantiation circuitry interprets the requirement syntax and executes the instantiation rules with input from the instantiation metadata to issue infrastructure instantiation requests to cause instantiation of the resources requested by the developers. Further, state file unification circuitry facilitates developer collaboration by receiving and managing state files for the individual developer projects. In addition, in some embodiments, the cloud infrastructure test automation systems described herein includes a validation circuitry. The validation circuitry helps to ensure that the instantiation requests that the cloud infrastructure test automation systems described herein makes to the infrastructure providers are completed correctly, cause the expected infrastructure results, and that the infrastructure remains correct over time. To that end, the validation circuitry issues validation requests to the infrastructure providers. The infrastructure providers return ICV messages to the cloud infrastructure test automation systems described herein. Examples of ICV messages include responses to validation requests, responses to instantiation requests, and infrastructure status messages.

The instantiation circuitry, state file unification circuitry, validation circuitry, requests, and other features of the cloud infrastructure test automation systems described herein improve the operation and function of the underlying computer hardware itself. That is, these features (among others described) are specific improvements in way that the underlying computer system operates and solve technical challenges with infrastructure instantiation and validation, as well as developer collaborating in serverless execution environments. The improvements facilitate more efficient, accurate, consistent, and precise building of resources that can operate properly in serverless function environments. The improved functioning of the underlying computer hardware itself achieves further technical benefits. For example, the cloud infrastructure test automation systems described herein avoids lack of automation, reduces manual intervention, reduces the possibility for human error, and therefore increases infrastructure instantiation efficiency and reduces wait times for correct resource setup and execution. In addition, the cloud infrastructure test automation systems described herein provides additional abstraction, so that testers need not be complete experts in complex IaC syntaxes. The developers may instead concentrate on the particular goals of their projects with less time and energy spent on mastering intricate IaC coding.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of automatically integrating security tools into a DevOps pipeline, the method comprising:
   receiving, by a security integration system and from a client device, access to a source code stored in a repository;
   processing, by the security integration system, the source code with an analyzer engine to identify a first file type used in the source code;
   automatically selecting, by the security integration system and in response to identification of the first file type, a first security tool suited to detect security threats in the first file type, the first security tool associated with a first script template;
   automatically generating, by the security integration system, a first integration script based on the first script template;
   inserting, from the security integration system, the first integration script into the source code; and
   automatically initiating integration of the first security tool into the DevOps pipeline for the source code.

2. The method of claim 1, further comprising determining, via the analyzer engine, a first build stage in which the first file type is used, and causing integration of the first security tool to occur in the first build stage of the DevOps pipeline.

3. The method of claim 1, further comprising providing, via the security integration system, a user interface that includes selectable items associated with automatic deployment of security tools to a DevOps pipeline.

4. The method of claim 1, further comprising receiving, at the security integration system, a first user input, wherein the first user input is used to authenticate each access session from the security integration system with the repository.

5. The method of claim 1, further comprising processing, by the security integration system, the source code with the analyzer engine, to identify a second file type used in the source code;
   selecting, by the security integration system, a second security tool suited to detect security threats in the second file type, the second security tool associated with a second script template;
   generating, by the security integration system, a second integration script based on the second script template;
   inserting, from the security integration system, the second integration script into the source code; and automatically initiating integration of the second security tool into the DevOps pipeline for the source code.

6. The method of claim 2, further comprising determining, via the analyzer engine, a second build stage in which the second file type is used, the second build stage differing from the first build stage, and causing integration of the second security tool to occur in the second build stage of the DevOps pipeline.

7. The method of claim 1, further comprising presenting a user interface that includes an interactive visualization dashboard depicting each stage detected in the source code and one or more security tools supported by the security integration system that can be integrated into each stage.

8. A non-transitory computer-readable medium storing software comprising instructions executable by one or more computers which, upon such execution, cause the one or more computers to:
receive, by a security integration system and from a client device, access to a source code stored in a repository;
process, by the security integration system, the source code with an analyzer engine to identify a first file type used in the source code;
automatically select, by the security integration system and in response to identification of the first file type, a first security tool suited to detect security threats in the first file type, the first security tool associated with a first script template;
automatically generate, by the security integration system, a first integration script based on the first script template;
insert, from the security integration system, the first integration script into the source code;
automatically initiate integration of the first security tool into a DevOps pipeline for the source code, thereby merging the first integration script and the source code.

9. The non-transitory computer-readable medium storing software of claim 8, wherein the instructions further cause the one or more computers to determine, via the analyzer engine, a first build stage in which the first file type is used, and causing integration of the first security tool to occur in the first build stage of the DevOps pipeline.

10. The non-transitory computer-readable medium storing software of claim 8, wherein the instructions further cause the one or more computers to provide, via the security integration system, a user interface that includes selectable items associated with automatic deployment of security tools to a DevOps pipeline.

11. The non-transitory computer-readable medium storing software of claim 8, wherein the instructions further cause the one or more computers to receive, at the security integration system, a first user input, wherein the first user input is used to authenticate each access session from the security integration system with the repository.

12. The non-transitory computer-readable medium storing software of claim 8, wherein the instructions further cause the one or more computers to:
process, by the security integration system, the source code with the analyzer engine, to identify a second file type used in the source code;
select, by the security integration system, a second security tool suited to detect security threats in the second file type, the second security tool associated with a second script template;
generate, by the security integration system, a second integration script based on the second script template;
insert, from the security integration system, the second integration script into the source code; and
automatically initiate integration of the second security tool into the DevOps pipeline for the source code.

13. The non-transitory computer-readable medium storing software of claim 9, wherein the instructions further cause the one or more computers to determine, via the analyzer engine, a second build stage in which the second file type is used, the second build stage differing from the first build stage, and causing integration of the second security tool to occur in the second build stage of the DevOps pipeline.

14. The non-transitory computer-readable medium storing software of claim 8, wherein the instructions further cause the one or more computers to present a user interface that includes an interactive visualization dashboard depicting each stage detected in the source code and one or more security tools supported by the security integration system that can be integrated into each stage.

15. A system for automatically integrating security tools into a DevOps pipeline comprising:
one or more computers; and
one or more storage devices storing instructions,
wherein the one or more computers is configured to:
receive, by a security integration system and from a client device, access to a source code stored in a repository;
process, by the security integration system, the source code with an analyzer engine to identify a first file type used in the source code;
automatically select, by the security integration system and in response to identification of the first file type, a first security tool suited to detect security threats in the first file type, the first security tool associated with a first script template;
automatically generate, by the security integration system, a first integration script based on the first script template;
insert, from the security integration system, the first integration script into the source code; and
automatically initiate integration of the first security tool into a DevOps pipeline for the source code, thereby merging the first integration script and the source code.

16. The system of claim 15, wherein the one or more computers is configured to determine, via the analyzer engine, a first build stage in which the first file type is used, and causing integration of the first security tool to occur in the first build stage of the DevOps pipeline.

17. The system of claim 15, wherein the one or more computers is configured to provide, via the security integration system, a user interface that includes selectable items associated with automatic deployment of security tools to a DevOps pipeline.

18. The system of claim 15, wherein the one or more computers is configured to receive, at the security integration system, a first user input, wherein the first user input is used to authenticate each access session from the security integration system with the repository.

19. The system of claim 15, wherein the one or more computers is further configured to:
process, by the security integration system, the source code with the analyzer engine, to identify a second file type used in the source code;
select, by the security integration system, a second security tool suited to detect security threats in the second file type, the second security tool associated with a second script template;
generate, by the security integration system, a second integration script based on the second script template;

insert, from the security integration system, the second integration script into the source code; and automatically initiate integration of the second security tool into the DevOps pipeline for the source code.

20. The system of claim 16, wherein the one or more computers is configured to determine, via the analyzer engine, a second build stage in which the second file type is used, the second build stage differing from the first build stage, and causing integration of the second security tool to occur in the second build stage of the DevOps pipeline.

* * * * *